US008254638B2

(12) United States Patent
Masuda et al.

(10) Patent No.: US 8,254,638 B2
(45) Date of Patent: Aug. 28, 2012

(54) RANGING APPARATUS AND RANGING METHOD

(75) Inventors: Tomonori Masuda, Tokyo (JP); Youichi Sawachi, Kawaguchi (JP)

(73) Assignee: FUJIFILM Corporation, Tokyo (JP)

( * ) Notice: Subject to any disclaimer, the term of this patent is extended or adjusted under 35 U.S.C. 154(b) by 1215 days.

(21) Appl. No.: 12/037,587

(22) Filed: Feb. 26, 2008

(65) Prior Publication Data

US 2008/0205708 A1 Aug. 28, 2008

(30) Foreign Application Priority Data

Feb. 27, 2007 (JP) ................................. 2007-047371

(51) Int. Cl.
*G06K 9/00* (2006.01)
(52) U.S. Cl. ....................................................... 382/106
(58) Field of Classification Search .................. 382/106; 356/3, 3.03, 3.08, 4.07, 21, 486; 348/135; 702/158, 159
See application file for complete search history.

(56) References Cited

U.S. PATENT DOCUMENTS

| | | | |
|---|---|---|---|
| 4,756,617 A | | 7/1988 | Cain et al. |
| 4,855,760 A | * | 8/1989 | Kanayama ..................... 347/240 |
| 5,194,906 A | * | 3/1993 | Kimura et al. ................ 356/5.11 |
| 5,260,682 A | * | 11/1993 | Omamyuda et al. .......... 340/435 |
| 5,694,204 A | * | 12/1997 | Nakase et al. ................ 356/5.15 |
| 5,870,178 A | * | 2/1999 | Egawa et al. ................ 356/3.03 |
| 5,877,851 A | | 3/1999 | Stann et al. |
| 7,045,783 B2 | * | 5/2006 | Matveev ....................... 250/330 |
| 7,362,419 B2 | * | 4/2008 | Kurihara et al. ............. 356/4.07 |
| 7,834,305 B2 | * | 11/2010 | Hagio et al. ............... 250/214 R |
| 2004/0263673 A1 | * | 12/2004 | Kikuchi et al. ............... 348/345 |
| 2005/0030221 A1 | * | 2/2005 | Sperber ........................... 342/86 |
| 2005/0083396 A1 | * | 4/2005 | Shiota et al. .................. 347/239 |
| 2005/0088509 A1 | * | 4/2005 | Ohkubo ........................ 347/236 |
| 2005/0173617 A1 | * | 8/2005 | Deguchi et al. ............. 250/208.1 |
| 2005/0178946 A1 | * | 8/2005 | Hashimoto et al. ......... 250/208.1 |
| 2005/0195383 A1 | * | 9/2005 | Breed et al. .................. 356/4.01 |

FOREIGN PATENT DOCUMENTS

| | | |
|---|---|---|
| JP | 62-043589 A | 2/1987 |
| JP | 02-254397 A | 10/1990 |
| JP | 2002-090454 A | 3/2002 |

(Continued)

OTHER PUBLICATIONS

Rejection of the Application, dated Nov. 22, 2011, issued in corresponding JP Application No. 2007-047371, 4 pages in English and Japanese.

(Continued)

*Primary Examiner* — Jason M Repko
*Assistant Examiner* — Shervin Nakhjavan
(74) *Attorney, Agent, or Firm* — Sughrue Mion, PLLC

(57) ABSTRACT

A first ranging apparatus includes a light-emitting unit for emitting a series of first through fourth modulated lights which have respective different time lengths from a reference time to respective time points at which the first through fourth modulated lights start being emitted, a light-detecting unit for detecting reflected lights from an object that is irradiated with the first through fourth modulated lights, and a calculating unit for calculating the distance up to the object based on the phase difference between the first through fourth modulated lights and the reflected lights. The light-emitting unit comprises a start time controller for controlling the time lengths. The light-detecting units samples the amounts of the reflected lights in exposure periods established at a constant cycle length from the reference time.

14 Claims, 22 Drawing Sheets

FOREIGN PATENT DOCUMENTS

| | | |
|---|---|---|
| JP | 2003-279329 A | 10/2003 |
| JP | 2004-032682 A | 1/2004 |
| JP | 3758618 B2 | 2/2004 |
| JP | 2005-069927 A | 3/2005 |
| JP | 2005-181180 A | 7/2005 |
| JP | 2006-300616 A | 11/2006 |

OTHER PUBLICATIONS

Rejection of the Application, dated Nov. 22, 2011, issued in related Application No. 2008-040992, 4 pages in English and Japanese.

Rejection of the Application, dated Nov. 22, 2011, issued in related JP Application No. 2007-077861, 3 pages in English and Japanese.

* cited by examiner

STORED ELECTRIC CHARGE

STORED ELECTRIC CHARGE (ELECTRIC CHARGE TRANSFER)

(ELECTRIC CHARGE TRANSFER)

FIG. 11

| IDENTIFICATION CODE | REFERENCE DELAY TIME |
|---|---|
| // | // |
| // | // |
| // | // |

| IDENTIFICATION CODE | WAVELENGTH | REFERENCE DELAY TIME | 11TH DELAY TIME |
|---|---|---|---|
| // | // | // | // |
| // | // | // | // |
| // | // | // | // |

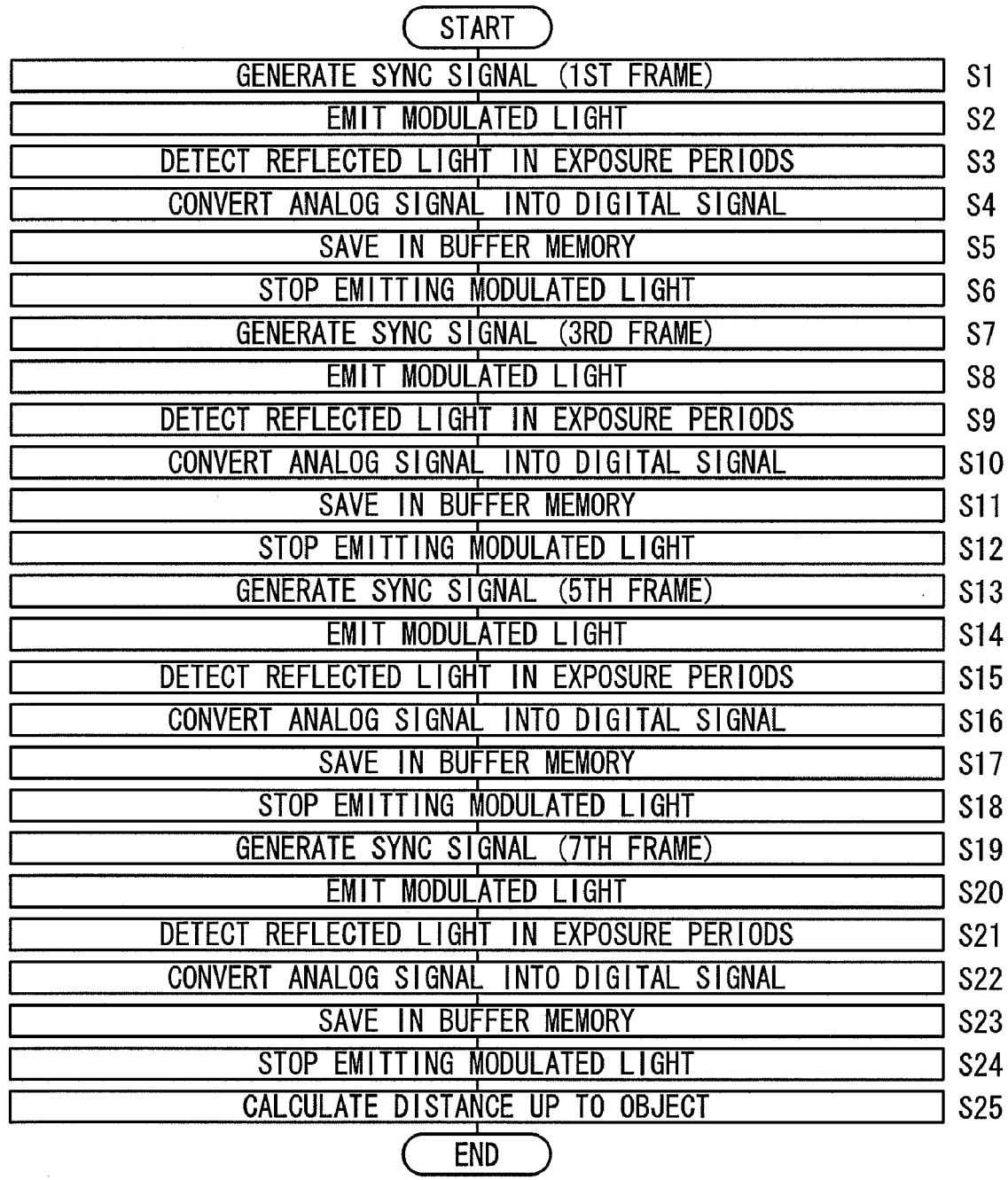

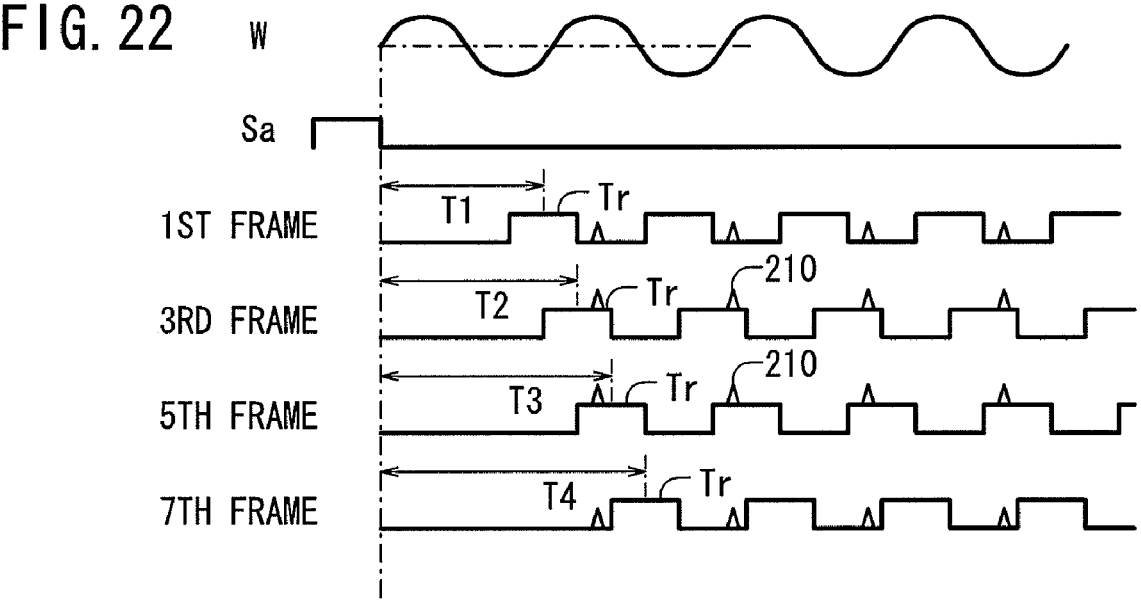

RANGING APPARATUS AND RANGING METHOD

BACKGROUND OF THE INVENTION

1. Field of the Invention

The present invention relates to a ranging apparatus and a ranging method, and more particularly to a ranging apparatus and a ranging method for detecting the phase delay of reflected light from an object that is irradiated with modulated light at each of the pixels of an image capturing device, for thereby detecting a three-dimensional structure of the object.

2. Description of the Related Art

One known process for measuring the distance up to an object is an optical TOF (Time Of Flight) ranging process.

As shown in FIG. 18 of the accompanying drawings, a ranging apparatus based on the optical TOF ranging process comprises a light source 200 in the form of an LED array, for example, for emitting intensity-modulated light (modulated light), an image capturing device 204 for detecting reflected light from an object 202 irradiated with the modulated light from the light source 200, and an optical system 206 for focusing the reflected light onto the image capturing device 204.

If the modulated light emitted from the light source 200 and applied to the object 202 is intensity-modulated, for example, at a high frequency of 20 MHz, then the modulated light has a wavelength of 15 m. When the modulated light travels back and forth over a distance of 7.5 m, the modulated light as it is detected by the image capturing device 204 has undergone a phase delay of one cycle length.

The phase delay that the reflected light undergoes with respect to the modulated light will be described below with reference to FIG. 19 of the accompanying drawings.

As shown in FIG. 19, a reflected light R has a phase delay of $\phi$ with respect to a modulated light W. In order to detect the phase delay of $\phi$, the reflected light R is sampled at four equal intervals, for example, in one cyclic period of the modulated light W. If the sampled amplitudes of the reflected light R at respective phases of 0°, 90°, 180°, 270°, for example, of the modulated light W are represented by A0, A1, A2, A3, respectively, then the phase delay of $\phi$ is expressed by the following equation:

$$\phi = \arctan\{(A3-A1)/(A0-A2)\}$$

The reflected light from the object 202 is focused onto the light-detecting surface of the image capturing device 204 by the optical system 206. The light-detecting surface of the image capturing device 204 comprises a two-dimensional matrix of pixels (photodiodes). When the phase delay of $\phi$ is determined at each of the pixels according to the above equation, a three-dimensional structure of the object 202 can be detected.

A ranging apparatus based on the above principle is disclosed in Japanese Patent No. 3758618, for example.

The disclosed ranging apparatus measures the distance from the apparatus to an object when reflected light from the object is detected in exposure periods established in a plurality of patterns by opening and closing the overflow drain gates (OFDG) or readout gates of an image capturing device out of phase with each other.

Specific details of the ranging process performed by the disclosed ranging apparatus will be described below with reference to FIGS. 20 and 21A through 21D of the accompanying drawings. In a first frame, in response to a negative-going edge of a synchronizing signal Sa (see FIG. 21A) in step S1 shown in FIG. 20, the light source 200 emits a modulated light W in step S2. When the object 202 is irradiated with the modulated light W, the object 202 reflects it as a reflected light R to the image capturing device 204. As shown in FIG. 21A, the image capturing device 204 is adjusted to have the center of a first exposure period Tr synchronized with a time point that is a time period T1 later than the negative-going edge of the synchronizing signal Sa, i.e., a time point at which the modulated light W has a phase of 0°. The image capturing device 204 is also adjusted such that each of successive exposure periods Tr thereof has a cycle length of $2\pi$.

In the first frame, the amount of reflected light R at the time the phase of the modulated light W is 0° is photoelectrically converted into an electric charge, which is stored in the image capturing device 204 in step S3. In a next second frame, the electric charge stored in the image capturing device 204 is transferred as an analog signal, and the analog signal is converted into a digital signal in step S4. The digital signal is saved in a buffer memory as a sampled amplitude A0 of the reflected light R at the time the phase of the modulated light W is 0° in step S5. Then, the light source 200 stops emitting the modulated light W in step S6.

Thereafter, in a next third frame, in response to a negative-going edge of the synchronizing signal Sa (see FIG. 21B) in step S7, the light source 200 emits the modulated light W again in step S8. When the object 202 is irradiated with the modulated light W, the object 202 reflects it as a reflected light R to the image capturing device 204. As shown in FIG. 21B, the image capturing device 204 is adjusted to have the center of a first exposure period Tr synchronized with a time point that is a time period T2 (>T1) later than the negative-going edge of the synchronizing signal Sa, i.e., a time point at which the modulated light W has a phase of 90°. The image capturing device 204 is also adjusted such that each of successive exposure periods Tr thereof has a cycle length of $2\pi$.

In the third frame, the amount of reflected light R at the time the phase of the modulated light W is 90° is photoelectrically converted into an electric charge, which is stored into the image capturing device 204 in step S9. In a next fourth frame, the electric charge stored in the image capturing device 204 is transferred as an analog signal, and the analog signal is converted into a digital signal in step S10. The digital signal is saved in a buffer memory as a sampled amplitude A1 of the reflected light R at the time the phase of the modulated light W is 90° in step S11. Then, the light source 200 stops emitting the modulated light W in step S12.

Thereafter, in a next fifth frame, in response to a negative-going edge of the synchronizing signal Sa (see FIG. 21C) in step S13, the light source 200 emits the modulated light W again in step S14. When the object 202 is irradiated with the modulated light W, the object 202 reflects it as a reflected light R to the image capturing device 204. As shown in FIG. 21C, the image capturing device 204 is adjusted to have the center of a first exposure period Tr synchronized with a time point that is a time period T3 (>T2) later than the negative-going edge of the synchronizing signal Sa, i.e., a time point at which the modulated light W has a phase of 180°. The image capturing device 204 is also adjusted such that each of successive exposure periods Tr thereof has a cycle length of $2\pi$.

In the fifth frame, the amount of reflected light R at the time the phase of the modulated light W is 180° is photoelectrically converted into an electric charge, which is stored into the image capturing device 204 in step S15. In a next fourth frame, the electric charge stored in the image capturing device 204 is transferred as an analog signal, and the analog signal is converted into a digital signal in step S16. The digital signal is saved in a buffer memory as a sampled amplitude A2 of the reflected light R at the time the phase of the modulated light W is 180° in step S17. Then, the light source 200 stops emitting the modulated light W in step S18.

Thereafter, in a next seventh frame, in response to a negative-going edge of the synchronizing signal Sa (see FIG. 21D) in step S19, the light source 200 emits the modulated light W again in step S20. When the object 202 is irradiated with the modulated light W, the object 202 reflects it as a reflected light R to the image capturing device 204. As shown in FIG. 21D, the image capturing device 204 is adjusted to have the center of a first exposure period Tr synchronized with a time point that is a time period T4 (>T3) later than the negative-going edge of the synchronizing signal Sa, i.e., a time point at which the modulated light W has a phase of 270°. The image capturing device 204 is also adjusted such that each of successive exposure periods Tr thereof has a cycle length of $2\pi$.

In the seventh frame, the amount of reflected light R at the time the phase of the modulated light W is 270° is photoelectrically converted into an electric charge, which is stored into the image capturing device 204 in step S21. In a next eighth frame, the electric charge stored in the image capturing device 204 is transferred as an analog signal, and the analog signal is converted into a digital signal in step S22. The digital signal is saved in a buffer memory as a sampled amplitude A3 of the reflected light R at the time the phase of the modulated light W is 270° in step S23. Then, the light source 200 stops emitting the modulated light W in step S24.

The phase delay $\phi$ of the reflected light R is determined based on the sampled amplitudes A0, A1, A2, A3 stored in the buffer memory, and the distance from the ranging apparatus to the object 202 is determined based on the phase delay $\phi$ in step S25.

If the above ranging apparatus is incorporated in a digital camera, a surveillance camera, or the like, then the ranging apparatus is exposed to noise such as clock noise, etc. from a display circuit, other IC circuits, etc.

Since the frames have different exposure timings as shown in FIG. 22 of the accompanying drawings, noise spikes 210 may be added to the exposure periods Tr of a certain frame and noise spikes 210 may not be added to the exposure periods Tr of another frame. Consequently, it is difficult to remove those noise spikes 210. In the example shown in FIG. 22, the noise spikes 210 are added to the exposure periods Tr of the third and fifth frames.

In addition, inasmuch as it is necessary for the different frames to have the different time periods T1 through T4 from the negative-going edge of the synchronizing signal Sa to the center of the first exposure period Tr, a complex drive circuit is required to operate the image capturing device 204, and the ranging process is burdensome for the CPU used therein.

SUMMARY OF THE INVENTION

It is an object of the present invention to provide a ranging apparatus and a ranging method which are less susceptible to noise, require a simple drive circuit for operating an image capturing device, and are less burdensome for the CPU incorporated in the ranging apparatus.

According to a first aspect of the present invention, there is provided a ranging apparatus comprising a light-emitting unit for emitting a series of modulated lights which are intensity-modulated and have respective different time lengths from a reference time to respective time points at which the modulated lights start being emitted, a light-detecting unit for detecting reflected lights from an object that is irradiated with the modulated lights, and a calculating unit for calculating the distance up to the object based on the phase difference between the modulated lights and the reflected lights.

The ranging apparatus thus constructed is less susceptible to noise. Since a circuit for energizing an image capturing device used in the ranging apparatus is relatively simple, the ranging apparatus is less burdensome for a CPU incorporated therein.

According to the first aspect of the present invention, the light-emitting unit may comprise a light emitter and a light emission controller for intensity-modulating a light emitted from the light emitter and emitting the intensity-modulated light as the modulated lights, the light emission controller including a start time controller for controlling the time lengths.

The light-detecting unit may sample the amounts of the reflected lights in exposure periods established at a constant cycle length from the reference time. Preferably, the light-detecting unit comprises an invalid period setting unit for setting an invalid period during which the light-detecting unit does not sample the amounts of the reflected lights in at least the exposure periods which are included in the time lengths. The ranging apparatus disclosed in Japanese Patent No. 3758618 has needed to provide a plurality of patterns for arranging exposure periods, and hence required a complex circuit for energizing an image capturing device. According to the first aspect of the present invention, however, as the exposure periods are established in a single pattern, the circuit for energizing the image capturing device is relatively simple, and the ranging apparatus is less burdensome for the CPU incorporated therein.

According to the first aspect of the present invention, the light-detecting unit may comprise an exposure period changer for changing terminal ends of the exposure periods based on an external control signal, and the light-emitting unit may comprise a reference time changer for changing a start timing of the reference time based on the exposure periods which have been changed by the exposure period changer.

If the object and its background are so bright that the signal generated by the light-detecting unit is saturated, then the durations of the exposure periods may be changed by a user's command input, an automatic iris mechanism, or an electronic shutter combined with the image capturing device. In other words, the durations of the exposure periods may be changed based on an external control signal. The durations of the exposure periods are usually changed while the central points of the exposure periods remain unchanged in position. Therefore, the start times of the exposure periods are changed, and hence the timings at which the drive signal is applied to the image capturing device need to be changed, resulting in the need for a calibration.

According to the first aspect of the present invention, the exposure period changer changes the terminal ends of the exposure periods to change the durations of the exposure periods, and the reference time changer changes the start timing of the reference time based on the changed exposure periods. It is not necessary to change the start times of the exposure periods. No calibration of the ranging apparatus is required since the start times of the exposure periods are not changed.

The ranging apparatus may further comprise a memory storing a table which registers therein information on the start timing of the reference time which corresponds to the changed exposure periods, and the reference time changer may change the start timing of the reference time based on the changed exposure periods and the information registered in the table stored in the memory. The reference time changer can change the start timing of the reference time based on the changed exposure periods by referring to the table. The processing time required by the ranging apparatus can be thus shortened.

The ranging apparatus may further comprise a reference time calculator for calculating the start timing of the reference time based on the changed exposure periods, and the reference time changer may change the start timing of the reference time based on timing information from the reference time calculator. In this case, the ranging apparatus does not need a memory or a memory area for storing the table.

According to the first aspect of the present invention, the light-detecting unit may comprise an exposure timing changer for changing the cycle length of the exposure periods based on an external control signal, and the light-emitting unit may comprise a wavelength changer for changing respective wavelengths of the modulated lights based on the cycle length of the exposure periods which has been changed by the exposure timing changer, a reference time changer for changing a start timing of the reference time based on the changed cycle length of the exposure periods, and a start time changer for changing the time lengths based on the changed cycle length of the exposure periods.

If the distance up to the object is so large that the calculated distance is of an invalid value, then the wavelengths of the modulated lights may be changed by a CPU control signal or a user's command input. In other words, the wavelengths of the modulated lights may be changed based on an external control signal. In this case, the central time points of the exposure periods are usually determined depending on the changed wavelengths of the modulated lights. If the wavelengths of the exposure periods are changed to a value which is related to the preset cycle length of the exposure periods by an integral number, e.g., if the wavelengths of the exposure periods are divided by an integer or multiplied by an integer, then the process is simple. However, if the wavelengths of the exposure periods are changed to a value which is related to the preset cycle time of the exposure periods by a real number, then the ranging apparatus needs a dedicated calibration.

According to the first aspect of the present invention, however, the wavelength changer changes the respective wavelengths of the modulated lights based on the above-mentioned external control signal, the exposure timing changer changes the cycle length of the exposure periods based on the external control signal, the reference time changer changes the start timing of the reference time based on the cycle length of the exposure periods which has been changed by the exposure timing changer, and the start time changer changes the time lengths based on the changed cycle length of the exposure periods. Consequently, the wavelengths of the modulated lights can be set depending on the cycle length of the exposure periods. The exposure timings can therefore be changed to a value which is related to the preset cycle length of the exposure periods by an integral number, e.g., the exposure timings can be divided by an integer or multiplied by an integer. Accordingly, the circuit arrangement of the ranging apparatus is relatively simple.

The ranging apparatus may further comprise a memory storing a table which registers therein information on the wavelengths of the modulated lights corresponding to the changed cycle length of the exposure periods, the start timing of the reference time, and the time lengths, the wavelength changer may change the wavelengths of the modulated lights based on the changed cycle length of the exposure periods and the information registered in the table stored in the memory, the reference time changer may change the start timing of the reference time based on the changed cycle length of the exposure periods and the information registered in the table, and the start time changer may change the time lengths based on the changed cycle length of the exposure periods and the information registered in the table. Therefore, the wavelength changer changes the wavelengths of the modulated lights based on the changed cycle length of the exposure periods by referring to the table, the reference time changer changes the start timing of the reference time by referring to the table, and the start time changer changes the time lengths by referring to the table. The processing time required by the ranging apparatus can be thus shortened.

The ranging apparatus may further comprise a wavelength calculator for calculating the wavelengths of the modulated lights based on the changed cycle length of the exposure periods, a reference time calculator for calculating the start timing of the reference time based on the changed cycle length of the exposure periods, and a start time calculator for calculating the time lengths based on the changed cycle length of the exposure periods. In this case, the ranging apparatus does not need a memory or a memory area for storing the table.

According to the first aspect of the present invention, the light-emitting unit may emit a first modulated light over a predetermined period from a first emission start reference time and a second modulated light over the predetermined period from a second emission start reference time, the first and second emission start reference times being different from each other, the light-detecting unit may detect a first reflected light from the object irradiated with the first modulated light over the predetermined period from the first emission start reference time and a second reflected light from the object irradiated with the second modulated light over the predetermined period from the second emission start reference time, and the calculating unit may calculate the distance up to the object based on at least the phase difference between the first modulated light and the first reflected light and the phase difference between the second modulated light and the second reflected light.

The light-detecting unit may sample the amount of the first reflected light in exposure periods established at a constant cycle length from the first emission start reference time and the amount of the second reflected light in exposure periods established at the constant cycle length from the second emission start reference time, the calculating unit may invalidate, in terms of calculation of the distance, the amounts of the first and second reflected lights sampled in the exposure periods which are included in the time lengths, and the calculating unit may calculate a value representing the sampled amount of the first reflected light which is integrated over the predetermined period, as the phase difference between the first modulated light and the first reflected light, and a value representing the sampled amount of the second reflected light which is integrated over the predetermined period, as the phase difference between the second modulated light and the second reflected light.

According to the first aspect of the present invention, the ranging apparatus may further comprise a start time corrector for correcting the time lengths based on the difference between the distance up to the object which is calculated by the calculating unit and a distance measured up to the object.

Since the ranging apparatus can correct an error of the distance measured up to the object, the ranging apparatus can measure the distance accurately and stably.

According to a second aspect of the present invention, there is provided a ranging method comprising the steps of (a) emitting a series of modulated lights which are intensity-modulated and have respective different time lengths from a reference time to respective time points at which the modulated lights start being emitted, (b) detecting reflected lights from an object that is irradiated with the modulated lights, and (c) calculating the distance up to the object based on the phase difference between the modulated lights and the reflected lights.

The ranging method is less susceptible to noise. Since a circuit for energizing an image capturing device used in the ranging method is relatively simple, the ranging method is less burdensome for a CPU used to carry out the ranging method.

According to the second aspect of the present invention, the step (b) may comprise sampling the amounts of the reflected lights in exposure periods established at a constant cycle length from the reference time. Preferably, the step (b) may comprise setting an invalid period during which the amounts of the reflected lights are not sampled in at least the exposure periods which are included in the time lengths.

According to the second aspect of the present invention, the step (b) may comprise an exposure period changing step of changing terminal ends of the exposure periods based on an external control signal, and the step (a) may comprise a reference time changing step of changing a start timing of the reference time based on the exposure periods which have been changed by the exposure period changing step. The ranging method may use a table which registers therein information on the start timing of the reference time which corresponds to the changed exposure periods, and the reference time changing step may change the start timing of the reference time based on the changed exposure periods and the information registered in the table. Alternatively, the ranging method may further comprise a reference time calculating step of calculating the start timing of the reference time based on the changed exposure periods, and the reference time changing step may change the start timing of the reference time based on timing information from the reference time calculating step.

According to the second aspect of the present invention, the step (b) may comprise an exposure timing changing step of changing a cycle length of the exposure periods based on an external control signal, and the step (a) may comprise a wavelength changing step of changing respective wavelengths of the modulated lights based on the cycle length of the exposure periods which has been changed by the exposure timing changing step, a reference time changing step of changing a start timing of the reference time based on the changed cycle length of the exposure periods, and a start time changing step of changing the time lengths based on the changed cycle length of the exposure periods. The ranging method may use a table which registers therein information on the wavelengths of the modulated lights corresponding to the changed cycle length of the exposure periods, the start timing of the reference time, and the time lengths, and the wavelength changing step may change the wavelengths of the modulated lights based on the changed cycle length of the exposure periods and the information registered in the table, the reference time changing step may change the start timing of the reference time based on the changed cycle length of the exposure periods and the information registered in the table, and the start time changing step may change the time lengths based on the changed cycle length of the exposure periods and the information registered in the table. Alternatively, the ranging method may further comprise a wavelength calculating step of calculating the wavelengths of the modulated lights based on the changed cycle length of the exposure periods, a reference time calculating step of calculating the start timing of the reference time based on the changed cycle length of the exposure periods, and a start time calculating step of calculating the time lengths based on the changed cycle length of the exposure periods.

According to the second aspect of the present invention, the step (a) may comprise emitting a first modulated light over a predetermined period from a first emission start reference time and a second modulated light over the predetermined period from a second emission start reference time, the first and second emission start reference times being different from each other, the step (b) may comprise detecting a first reflected light from the object irradiated with the first modulated light over the predetermined period from the first emission start reference time, and a second reflected light from the object irradiated with the second modulated light over the predetermined period from the second emission start reference time, and the step (c) may comprise calculating the distance up to the object based on at least the phase difference between the first modulated light and the first reflected light and the phase difference between the second modulated light and the second reflected light.

The step (b) may comprise sampling the amount of the first reflected light in exposure periods established at a constant cycle length from the first emission start reference time and the amount of the second reflected light in exposure periods established at the constant cycle length from the second emission start reference time, the step (c) may comprise invalidating, in terms of the distance, the amounts of the first and second reflected lights sampled in the exposure periods which are included in the time lengths, and the step (c) may comprise calculating a value representing the sampled amount of the first reflected light which is integrated over the predetermined period, as the phase difference between the first modulated light and the first reflected light, and a value representing the sampled amount of the second reflected light which is integrated over the predetermined period, as the phase difference between the second modulated light and the second reflected light.

According to the second aspect of the present invention, the ranging method may further comprise the step of correcting the time lengths based on the difference between the distance up to the object which is calculated in the step (c) and a distance measured up to the object.

As described above, the ranging apparatus and the ranging method according to the present invention are less susceptible to noise. Since the circuit for energizing the image capturing device used in the ranging apparatus and the ranging method is relatively simple, the ranging apparatus and the ranging method is less burdensome for the CPU used therein.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11 is a diagram showing details of a first information table;

FIG. 15 is a diagram showing details of a second information table;

FIG. 20 is a flowchart of a processing sequence of a ranging apparatus according to the related art;

FIG. 22 is a waveform diagram illustrative of drawbacks of the ranging apparatus according to the related art.

DESCRIPTION OF THE PREFERRED EMBODIMENTS

Figure 1:
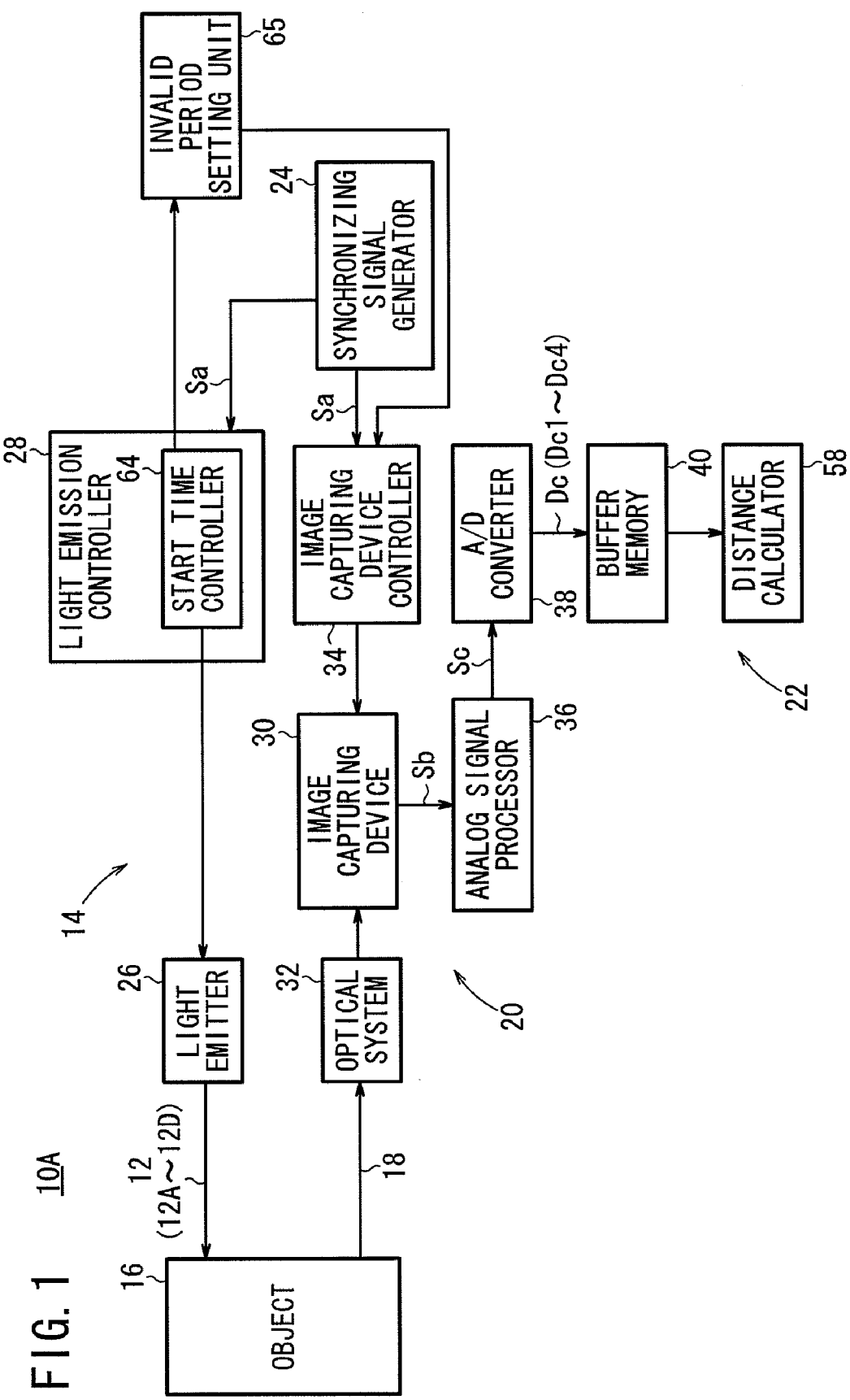
FIG. 1 is a block diagram of a first ranging apparatus according to the present invention.

Like or corresponding parts are denoted by like or corresponding reference characters.

Ranging apparatus and ranging methods according to preferred embodiments of the present invention will be described below with reference to FIGS. 1 through 17.

As shown in FIG. 1, a ranging apparatus 10A according to a first embodiment of the present invention (hereinafter referred to as "first ranging apparatus 10A") comprises a light-emitting means 14 for emitting a series of modulated lights 12 which have been intensity-modulated and which start being emitted at respective times that are spaced from a reference time by different time periods, a light-detecting means 20 for detecting reflected lights 18 from an object 16 which has been irradiated with the modulated lights 12, a calculating means 22 for calculating the distance from the first ranging apparatus 10A to the object 16 based on the phase differences between the modulated lights 12 and the reflected lights 18, and a synchronizing signal generator 24 for generating a synchronizing signal Sa which represents the start of a light emission process.

The light-emitting means 14 comprises a light emitter 26 and a light emission controller 28 for controlling the light emitter 26 to intensity-modulate lights emitted from the light emitter 26 and emit them as the modulated lights 12. The light emitter 26 starts emitting the modulated lights 12 at respective times that are spaced from a reference time t0, which is aligned with a negative-going edge ta, for example, of the synchronizing signal Sa, by different time periods.

The light emitter 26 comprises an array of LEDs. The light emission controller 28 controls the light emitter 26 to emit lights that are intensity-modulated sinusoidally, for example, as the modulated lights 12.

The light-detecting means 20 comprises an image capturing device 30, an optical system 32 for focusing the reflected lights 18 onto the light-detecting surface of the image capturing device 30, an image capturing device controller 34 for energizing the image capturing device 30, an analog signal processor 36 for processing a captured image signal Sb from the image capturing device 30 into an analog image signal Sc, an A/D converter 38 for converting the analog image signal Sc into digital image data Dc, and a buffer memory 40 for storing the digital image data Dc therein.

Figure 2:
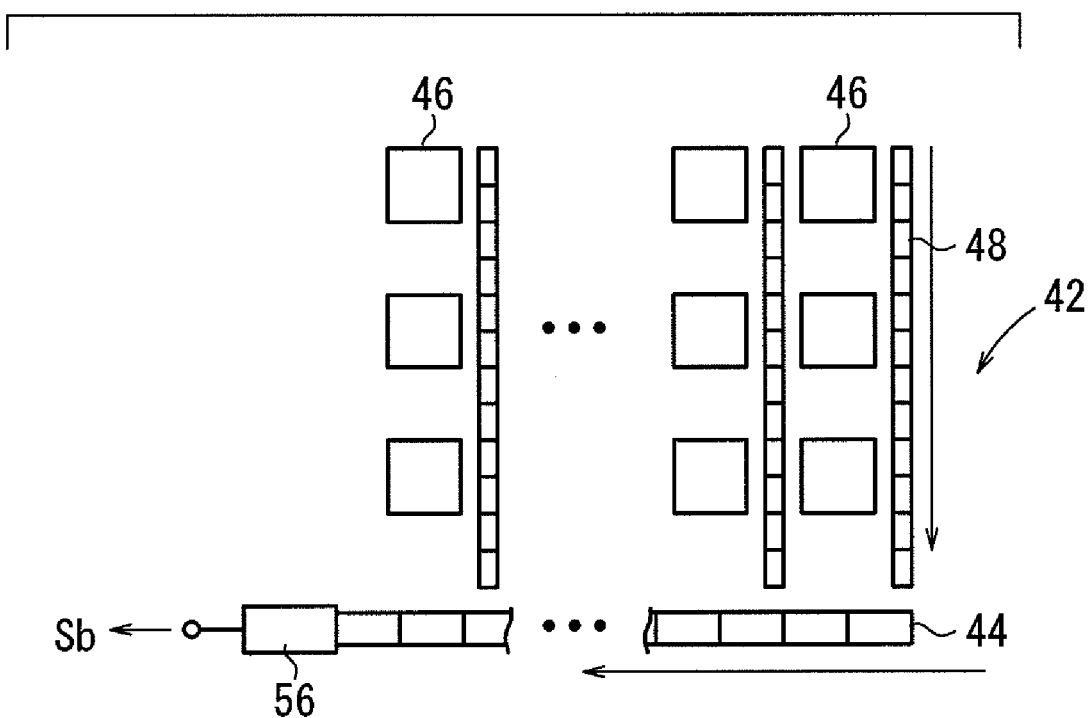
FIG. 2 is a schematic view of a general structure of an image capturing device.

As shown in FIG. 2, the image capturing device 30 comprises a light detector 42 and a horizontal transfer path 44 disposed adjacent to the light detector 42. The light detector 42 comprises a matrix of pixels 46 (photodiodes) for photoelectrically converting an amount of light applied thereto into an amount of electric charge corresponding to the applied amount of light. The image capturing device 30 also includes a plurality of vertical transfer paths 48 that are shared by respective columns of pixels 46 and spaced apart along rows of pixels 46. The horizontal transfer path 44 is shared by the vertical transfer paths 48.

Figure 3A:
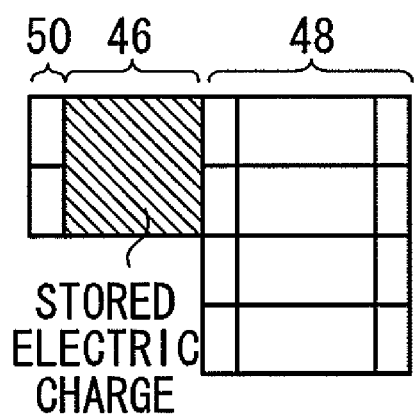
FIGS. 3A and 3B are views showing how an electric charge is stored in the image capturing device.
Figure 3B:
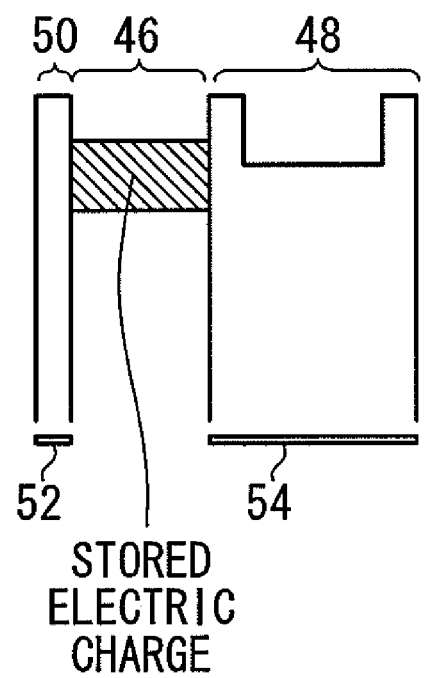

A process of reading electric charges from the pixels 46 based on the concept of frames used in the outputting of video data will be described below. As shown in FIGS. 3A and 3B, each of the pixels 46 generates an electric charge in response to a reflected light 18 applied thereto and stores the generated electric charge (exposure) in a first frame. At this time, the pixel 46 is not exposed to the reflected light 18 throughout the first frame, but is exposed to the reflected light 18 in each of exposure periods that are established at required timings. Specifically, the exposure periods are established by energizing an electrooptical shutter or a CCD electronic shutter combined with the image capturing device 30 based on a control signal from the image capturing device controller 34. An overflow drain region 50 is disposed adjacent to each of the pixels 46. When a predetermined voltage is applied to a drain electrode 52 connected to the overflow drain region 50, the potential of the overflow drain region 50 is lowered to drain the electric charge stored in the pixel 46.

Figure 4A:
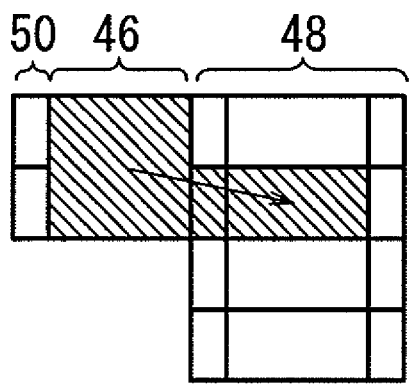
FIGS. 4A and 4B are views showing how an electric charge is transferred in the image capturing device.
Figure 4B:
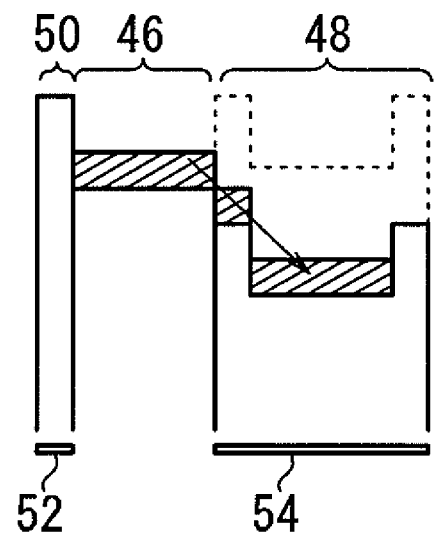

In a next second frame, the electric charge is transferred. Specifically, during a vertical blanking period, for example, of the second frame, as shown in FIGS. 4A and 4B, a predetermined voltage is applied to a vertical transfer electrode 54 corresponding to one packet of the vertical transfer path 48, thereby lowering the potential of the packet to a level lower than the potential of the pixel 46. The electric charge stored in the pixel 46 now flows into the vertical transfer path 48. Thereafter, the potential is restored, and during a horizontal blanking period, a transfer voltage is applied to the vertical transfer electrode 54 to transfer the electric charge to the horizontal transfer path 44, as shown in FIG. 2. When the electric charge is transferred to the horizontal transfer path 44, a transfer voltage is applied to a horizontal transfer electrode connected to the horizontal transfer path 44 during a horizontal scanning period, thereby transferring the electric charge along the horizontal transfer path 44 to an output circuit 56. The output circuit 56 converts the electric charge into a voltage signal depending on the amount of electric charge, and outputs the voltage signal as the captured image signal Sb.

The horizontal blanking period and the horizontal scanning period in the second frame are repeated to transfer a series of electric charges stored in the respective pixels 46 along the vertical transfer path 48 and the horizontal transfer path 44 to the output circuit 56, which outputs the captured image signal Sb.

In the second frame, the pixels 46 may be or may not be exposed to the reflected light 18.

The captured image signal Sb from the image capturing device 30 is processed into the analog image signal Sc by the analog signal processor 36. The analog image signal Sc is converted into the digital image data Dc by the A/D converter 38. The digital image data Dc have a data structure comprising an array of amplitudes of the reflected light 18 that are sampled at required timings (exposure periods) and associated with the respective pixels 46.

The buffer memory 40 stores four types of image data Dc (first through fourth image data Dc1 through Dc4) according to the optical TOF ranging process referred to above. The first image data Dc1 has a data structure comprising an array of amplitudes of the reflected light 18 that are sampled at timings when the phase of the modulated light 12 is 0°, for example, and associated with the respective pixels 46. Similarly, the second, third, and fourth image data Dc2, Dc3, Dc4 have a data structure comprising an array of amplitudes of the reflected light 18 that are sampled at timings when the phase of the modulated light 12 is 90°, 180°, 270°, for example, and associated with the respective pixels 46.

The calculating means 22 comprises a distance calculator 58 for calculating the distances from the respective pixels 46 to the object 16 based on the first through fourth image data Dc1 through Dc4.

A calculating algorithm of the distance calculator 58, particularly, a calculating algorithm for calculating the distance from one pixel 46 to the object 16 will be described below with reference to FIG. 5. If it is assumed that the modulated light 12 has its varying amplitude represented by a circle 60 with its center at the origin of a coordinate system, then the reflected light 18 has its amplitude at points P1, P2, P3, P4 when the modulated light 12 is at respective phases of 0° (360°), 90°, 180°, 270°. If the point P1 has coordinates (A, −B), then the point P2 has coordinates (B, A), the point P3 has coordinates (−A, B), and the point P4 has coordinates (−B, −A).

Figure 5:
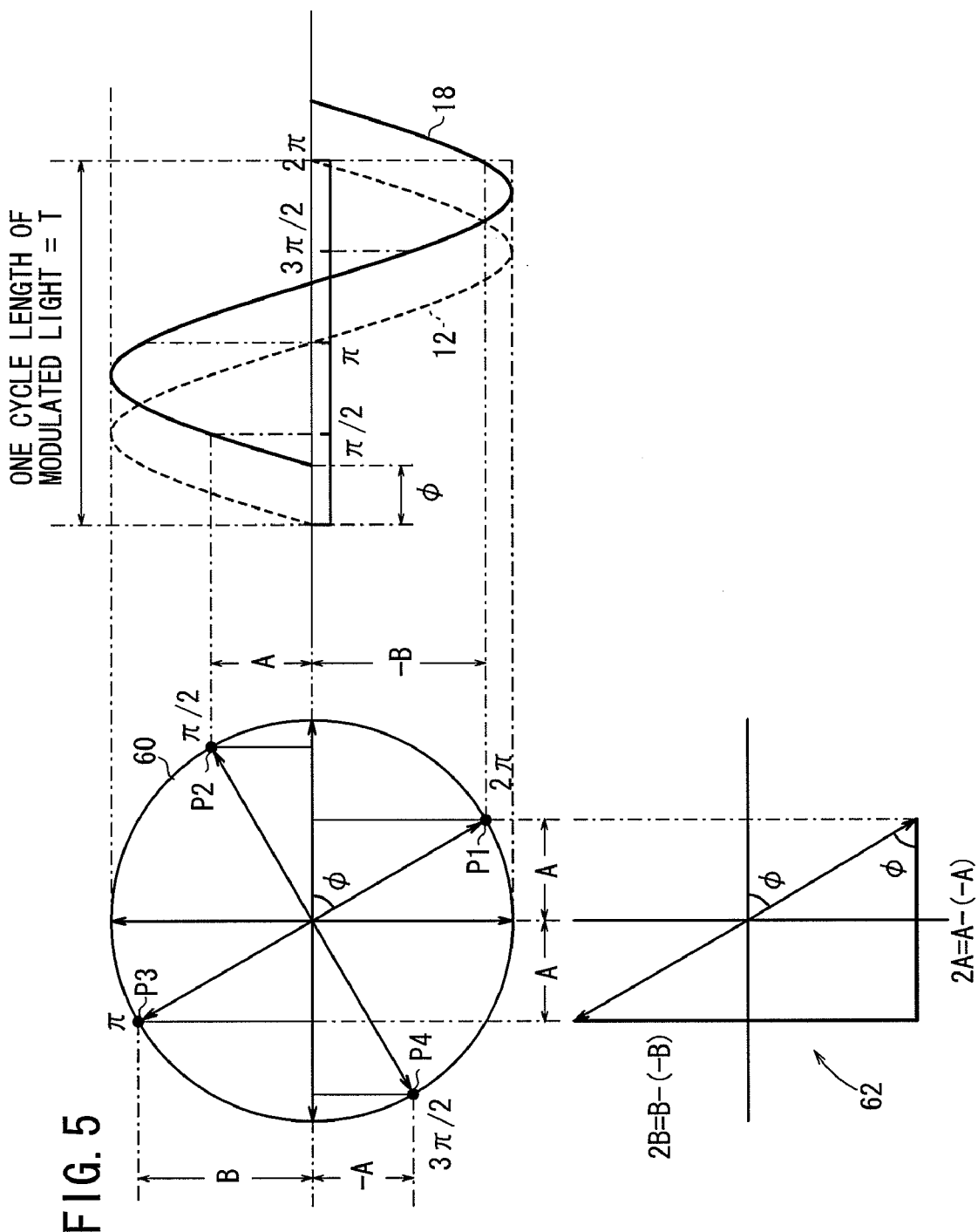
FIG. 5 is a diagram illustrative of the principle of a process for determining a phase delay of a reflected light from sampled amplitudes thereof based on a captured image signal from the image capturing device.

Since these coordinates can be converted into a rectangular triangle 62 shown in FIG. 5, the phase delay of φ of the reflected light 18 with respect to the modulated light 12 is determined by the following equation (1):

$$\phi = \arctan\{(B-(-B))/(A-(-A))\} \quad (1)$$

Since A corresponds to the sampled amplitude S2 of the second image data Dc2, −A the sampled amplitude S4 of the fourth image data Dc4, B the sampled amplitude S3 of the third image data Dc3, and −B the sampled amplitude S1 of the first image data Dc1, the equation (1) can be rewritten into the following equation (2):

$$\phi = \arctan\{(S3-S1)/(S2-S4)\} \quad (2)$$

If one cycle length of the modulated light 12 is indicated by T, then a delay time τ that is consumed after the modulated light 12 is emitted from the light emitter 26 until the reflected light 18 is detected by the image capturing device 30, is determined by the following equation:

$$\tau = T \times (\phi / 2\pi)$$

The delay time τ is commensurate with twice the distance L from the first ranging apparatus 10A to the object 16 and the light travels between the ranging apparatus 10A and the object 16. Therefore, the distance L is determined by the equation:

$$L = (\tau \times c)/2$$

The distance calculator 58 has the above algorithm installed as software, and applies the algorithm to each of the pixels 46 to calculate the distance depending on each of the pixels 46 for thereby detecting the three-dimensional structure of the object 16.

The light emission controller 28 of the first ranging apparatus 10A has a start time controller 64 for controlling the time lengths which are consumed after the reference time t0 until the respective modulated lights 12 start being applied to the object 16. The light-detecting means 20 samples the amounts of reflected lights 18 in exposure periods that are established with a constant cycle length based on the negative-going edge, for example, of the synchronizing signal Sa.

Figure 6:
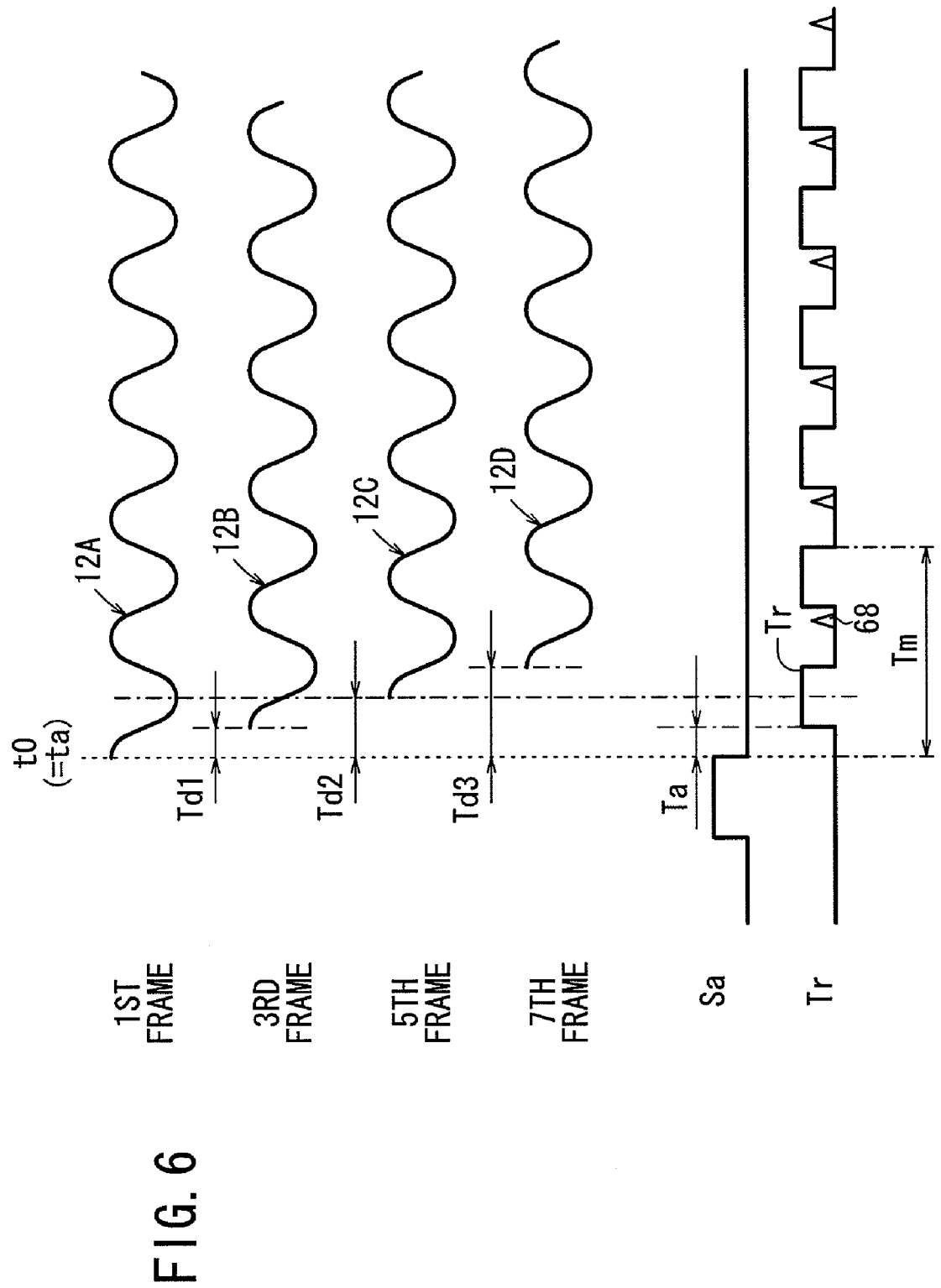
FIG. 6 is a waveform diagram showing the relationship between first through fourth modulated lights emitted from a light-emitting means, a synchronizing signal, and exposure periods.

In the first ranging apparatus 10A, the start time controller 64 controls the light emitter 26 to emit a series of modulated lights, i.e., as shown in FIG. 6, a first modulated light 12A which starts being emitted at the reference time t0, a second modulated light 12B which starts being emitted upon elapse of a first delay time Td1 from the reference time t0, a third modulated light 12C which starts being emitted upon elapse of a second delay time Td2 from the reference time t0, and a fourth modulated light 12D which starts being emitted upon elapse of a third delay time Td3 from the reference time t0.

The synchronizing signal Sa generated by the synchronizing signal generator 24 is supplied to the light emission controller 28 and the image capturing device controller 34 for enabling the light emission controller 28 (and the start time controller 64) and the image capturing device controller 34 to operate in synchronism with each other.

The first delay time Td1 is set to a value corresponding to the phase delay of 90° with respect to the wavelength of the first modulated light 12A. The second delay time Td2 is set to a value corresponding to the phase delay of 180° with respect to the wavelength of the first modulated light 12A. The third delay time Td3 is set to a value corresponding to the phase delay of 270° with respect to the wavelength of the first modulated light 12A.

A first exposure period Tr starts at a time point which is a given period Ta later than the reference time t0, and the cycle length of each of exposure periods Tr is equalized to one wavelength of the modulated light 12. With the exposure periods being thus established, it is possible to obtain a sampled amplitude of the reflected light 18 when the phase of the first modulated light 12A is either one of 0°, 90°, 180°, 270°, and also to obtain a sampled amplitude of the reflected light 18 when the phase of the second modulated light 12B is either one of 0°, 90°, 180°, 270° and different from the phase of the first modulated light 12A. Similarly, it is possible to obtain a sampled amplitude of the reflected light 18 when the phase of the third modulated light 12C is either one of 0°, 90°, 180°, 270° and different from the phases of the first and second modulated lights 12A, 12B, and also to obtain a sampled amplitude of the reflected light 18 when the phase of the fourth modulated light 12D is either one of 0°, 90°, 180°, 270° and different from the phases of the first, second, and third modulated lights 12A, 12B, 12C.

Figure 7A:
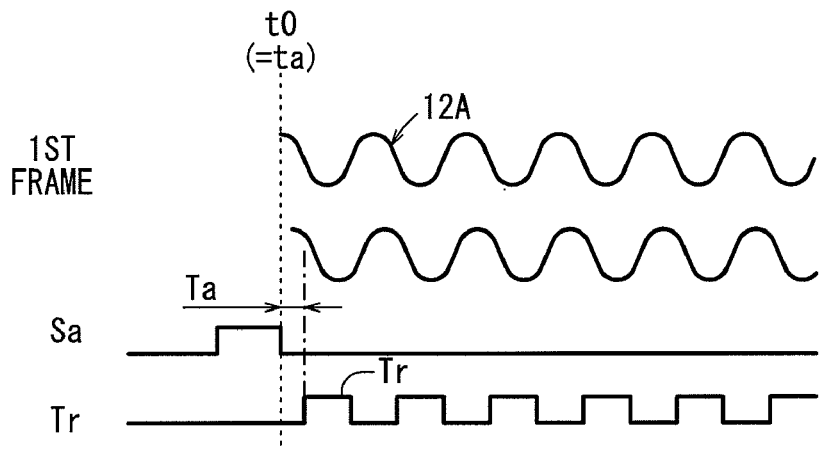
FIG. 7A is a waveform diagram showing the relationship between the first modulated light, a reflected light thereof, the synchronizing signal, and the exposure periods in a first frame.
Figure 7B:
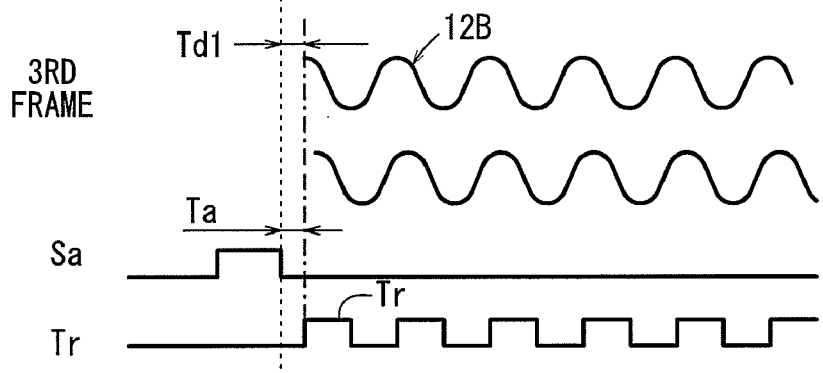
FIG. 7B is a waveform diagram showing the relationship between the second modulated light, a reflected light thereof, the synchronizing signal, and the exposure periods in a third frame.
Figure 7C:
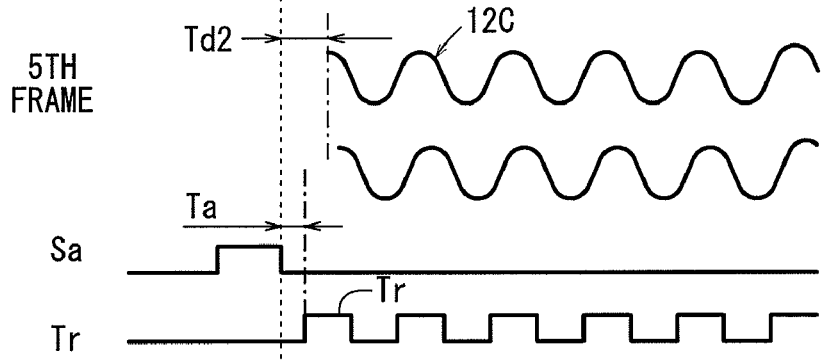
FIG. 7C is a waveform diagram showing the relationship between the third modulated light, a reflected light thereof, the synchronizing signal, and the exposure periods in a fifth frame.
Figure 7D:
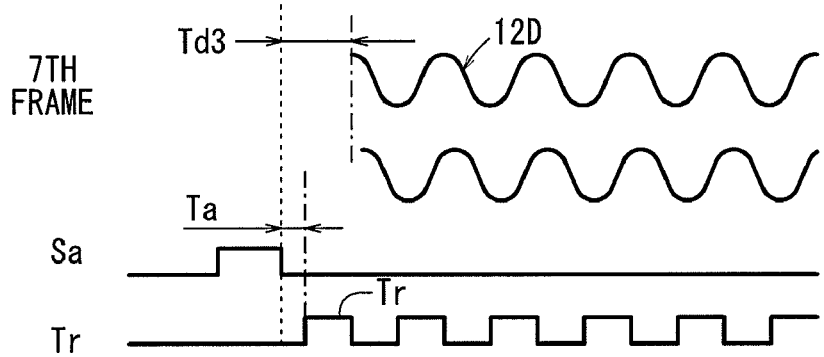
FIG. 7D is a waveform diagram showing the relationship between the fourth modulated light, a reflected light thereof, the synchronizing signal, and the exposure periods in a seventh frame.

FIGS. 7A through 7D show an example of the chronological relationship between the first through fourth modulated lights 12A through 12D and the exposure periods Tr. As shown in FIG. 7A, the centers of the exposure periods Tr are held in alignment with the phase of 270° of the first modulated light 12A. As shown in FIG. 7B, the centers of the exposure periods Tr are held in alignment with the phase of 180° of the second modulated light 12B. As shown in FIG. 7C, the centers of the exposure periods Tr are held in alignment with the phase of 90° of the third modulated light 12C. As shown in FIG. 7D, the centers of the exposure periods Tr are held in alignment with the phase of 0° of the fourth modulated light 12D.

Accordingly, it is possible to obtain a sampled amplitude S4 of the reflected light 18 when the phase of the first modulated light 12A is 270°, and also to obtain a sampled amplitude S3 of the reflected light 18 when the phase of the second modulated light 12B is 180°. Similarly, it is possible to obtain a sampled amplitude S2 of the reflected light 18 when the phase of the third modulated light 12C is 90°, and also to obtain a sampled amplitude S1 of the reflected light 18 when the phase of the fourth modulated light 12D is 0°.

If the first exposure period Tr is included in or overlaps the longest third delay time Td3, as shown in FIG. 6, then an amplitude sampled in the first exposure period Tr may not represent an actual sampled amplitude of the reflected light 18, and may possibly adversely affect the calculations to determine the distance and cause an erroneous measurement. To avoid this shortcoming, the first ranging apparatus 10A shown in FIG. 1 includes an invalid period setting unit 65.

The invalid period setting unit 65 sets an invalid period Tm in which the reflected light 18 is not sampled during some of the exposure periods Tr which are included in or overlap the third delay time Td3 from the reference time t0. In the example shown in FIG. 6, the invalid period Tm set by the invalid period setting unit 65 includes the first exposure period Tr after the reference time t0 and the next exposure period Tr. The information of the invalid period Tm is supplied to the image capturing device controller 34. Based on the supplied information of the invalid period Tm, the image capturing device controller 34 controls the image capturing device 30 to discharge the electric charges stored during the invalid period Tm from the reference time t0 through the overflow drain region 50 (see FIGS. 3A, 3B). In the example shown in FIG. 6, therefore, the reflected light 18 is actually sampled by the image capturing device 30 from the third exposure period Tr. The above problem caused by the first through the third delay times Td1 through Td3, i.e., the problem that an amplitude sampled in the first exposure period may possibly adversely affect the calculations to determine the distance, is prevented from occurring.

A processing sequence of the first ranging apparatus 10A will be described below with reference to the waveform diagrams shown in FIGS. 7A through 7D and a flowchart shown in FIG. 8. The description to be given below of the processing sequence of the first ranging apparatus 10A is premised on the invalid period Tm set by the invalid period setting unit 65.

Figure 8:
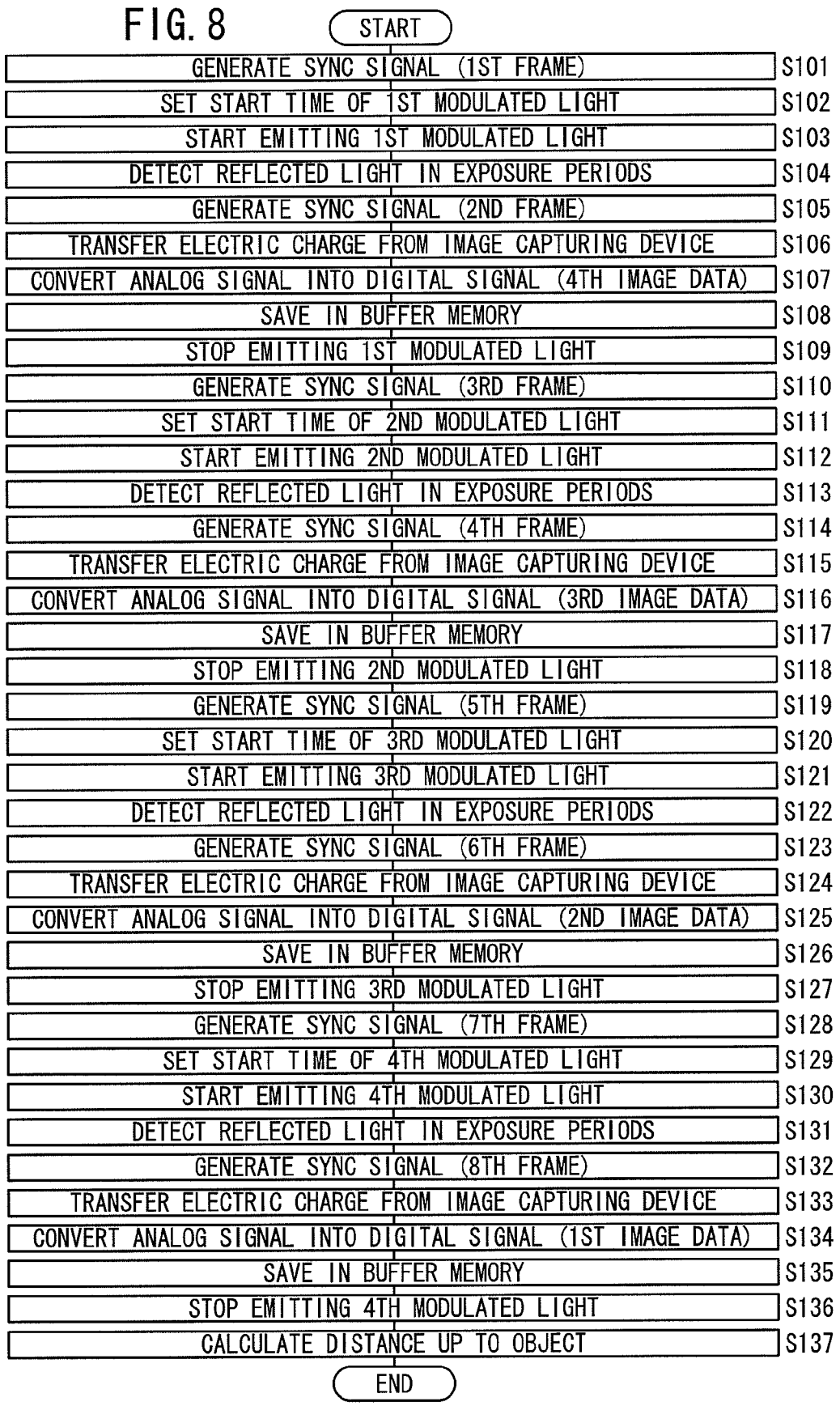
FIG. 8 is a flowchart of a processing sequence of the first ranging apparatus.

First, the synchronizing signal generator 24 generates a synchronizing signal Sa representing a first frame in step S101 shown in FIG. 8 (see FIG. 7A). In response to a rising edge of the synchronizing signal Sa, the start time controller 64 sets a start time for a first modulated light 12A in step S102. In this case, the start time is set to 0. Therefore, the light emission controller 28 controls the light emitter 26 to emit a first modulated light 12A based on the time point ta (=the reference time t0) of the negative-going edge of the synchronizing signal Sa in step S103.

The first modulated light 12A emitted from the light emitter 26 is applied to the object 16, and the object 16 reflects it as a reflected light 18 to the image capturing device 30 through the optical system 32. The image capturing device 30 is adjusted to have the center of the first exposure period Tr synchronized with a time point that is a time period Ta later than the reference time t0, i.e., a time point at which the first modulated light 12A has a phase of 270°. The image capturing device 30 is also adjusted such that each of successive exposure periods Tr thereof has a cycle length of $2\pi$ (see FIG. 7A).

In the first frame, the amount of reflected light 18 at the time the phase of the first modulated light 12A is 270° is photoelectrically converted into an electric charge, which is stored in the image capturing device 30 in step S104. Thereafter, the synchronizing signal generator 24 generates a synchronizing signal Sa representing a second frame in step S105. In the second frame, the electric charge stored in the image capturing device 30 is transferred as an analog signal (image signal) in step S106, and the analog signal is converted into a digital signal in step S107. The digital signal is saved in the buffer memory 40 as fourth image data Dc4 representing a pixel-dependent array of sampled amplitudes S4 of the reflected light 18 at the time the phase of the first modulated light 12A is 270° in step S108. Then, the light emitter 26 stops emitting the first modulated light 12A in step S109.

Then, the synchronizing signal generator 24 generates a synchronizing signal Sa representing a third frame in step S110 (see FIG. 7B). In response to a rising edge of the synchronizing signal Sa, the start time controller 64 sets a start time for a second modulated light 12B to the first delay time Td1 in step S111. The light emission controller 28 controls the light emitter 26 to emit a second modulated light 12B from a time point upon elapse of the first delay time Td1 from the time point ta (=the reference time t0) of the negative-going edge of the synchronizing signal Sa in step S112.

The second modulated light 12B emitted from the light emitter 26 is applied to the object 16, and the object 16 reflects it as a reflected light 18 to the image capturing device 30 through the optical system 32. As described above, the image capturing device 30 is adjusted to have the center of the first exposure period Tr synchronized with the time point that is the time period Ta later than the reference time t0, and is also adjusted such that each of successive exposure periods Tr thereof has a cycle length of $2\pi$. In the third frame, therefore, the amount of reflected light 18 at the time the phase of the second modulated light 12B is 180° is photoelectrically converted into an electric charge, which is stored in the image capturing device 30 in step S113 (see FIG. 7B). Thereafter, the synchronizing signal generator 24 generates a synchronizing signal Sa representing a fourth frame in step S114. In the fourth frame, the electric charge stored in the image capturing device 30 is transferred as an analog signal in step S115, and the analog signal is converted into a digital signal in step S116. The digital signal is saved in the buffer memory 40 as third image data Dc3 representing a pixel-dependent array of sampled amplitudes S3 of the reflected light 18 at the time the phase of the second modulated light 12B is 180° in step S117. Then, the light emitter 26 stops emitting the second modulated light 12B in step S118.

Then, the synchronizing signal generator 24 generates a synchronizing signal Sa representing a fifth frame in step S119 (see FIG. 7C). In response to a rising edge of the synchronizing signal Sa, the start time controller 64 sets a start time for a third modulated light 12C to the second delay time Td2 in step S120. The light emission controller 28 controls the light emitter 26 to emit a third modulated light 12C from a time point upon elapse of the second delay time Td2 from the time point ta (=the reference time t0) of the negative-going edge of the synchronizing signal Sa in step S121.

The third modulated light 12C emitted from the light emitter 26 is applied to the object 16, and the object 16 reflects it as a reflected light 18 to the image capturing device 30 through the optical system 32. As described above, the image capturing device 30 is adjusted to have the center of the first exposure period Tr synchronized with the time point that is the time period Ta later than the reference time t0, and is also adjusted such that each of successive exposure periods Tr thereof has a cycle length of $2\pi$. In the fifth frame, therefore, the amount of reflected light 18 at the time the phase of the third modulated light 12C is 90° is photoelectrically converted into an electric charge, which is stored in the image capturing device 30 in step S122 (see FIG. 7C). Thereafter, the synchronizing signal generator 24 generates a synchronizing signal Sa representing a sixth frame in step S123. In the sixth frame, the electric charge stored in the image capturing device 30 is transferred as an analog signal in step S124, and the analog signal is converted into a digital signal in step S125. The digital signal is saved in the buffer memory 40 as second image data Dc2 representing a pixel-dependent array of sampled amplitudes S2 of the reflected light 18 at the time the phase of the third modulated light 12C is 90° in step S126. Then, the light emitter 26 stops emitting the third modulated light 12C in step S127.

Then, the synchronizing signal generator 24 generates a synchronizing signal Sa representing a seventh frame in step S128 (see FIG. 7D). In response to a rising edge of the synchronizing signal Sa, the start time controller 64 sets a start time for a fourth modulated light 12D to the third delay time Td3 in step S129. The light emission controller 28 controls the light emitter 26 to emit a fourth modulated light 12D from a time point upon elapse of the third delay time Td3 from the time point ta (=the reference time t0) of the negative-going edge of the synchronizing signal Sa in step S130.

The fourth modulated light 12D emitted from the light emitter 26 is applied to the object 16, and the object 16 reflects it as a reflected light 18 to the image capturing device 30 through the optical system 32. As described above, the image capturing device 30 is adjusted to have the center of the first exposure period Tr synchronized with the time point that is the time period Ta later than the reference time t0, and is also adjusted such that each of successive exposure periods Tr thereof has a cycle length of $2\pi$. In the seventh frame, therefore, the amount of reflected light 18 at the time the phase of the fourth modulated light 12D is 0° is photoelectrically converted into an electric charge, which is stored in the image capturing device 30 in step S131 (see FIG. 7D). Thereafter, the synchronizing signal generator 24 generates a synchronizing signal Sa representing an eighth frame in step S132. In the eighth frame, the electric charge stored in the image capturing device 30 is transferred as an analog signal in step S133, and the analog signal is converted into a digital signal in step S134. The digital signal is saved in the buffer memory 40 as first image data Dc1 representing a pixel-dependent array of sampled amplitudes S1 of the reflected light 18 at the time the phase of the fourth modulated light 12D is 0° in step S135. Then, the light emitter 26 stops emitting the fourth modulated light 12D in step S136.

Then, the distance calculator 58 calculates the distance up to the object 16 based on the first through fourth image data Dc1 through Dc4 saved in the buffer memory 40 in step S137.

As described above, the first ranging apparatus 10A emits a series of modulated lights 12 which have been intensity-modulated and which start being emitted at respective times that are spaced from the reference time t0 by different time periods, detects reflected lights 18 from the object 16 which has been irradiated with the modulated lights 12, and calculates the distance up to the object 16 based on the phase differences between the modulated lights 12 and the reflected lights 18. If the first ranging apparatus 10A is incorporated in a digital camera, a surveillance camera, or the like, then the first ranging apparatus 10A is exposed to noise such as clock noise, etc. from a display circuit, other IC circuits, etc. However, as simply illustrated in FIG. 6, since the exposure timings do not change depending on the frames, the exposure periods Tr can easily be set out of alignment with the timings of noise spikes 68, making the first ranging apparatus 10A less susceptible to noise.

In the first ranging apparatus 10A, as the exposure periods Tr are established in a single pattern, the circuit (image capturing device controller 34) for energizing the image capturing device 30 is relatively simple, and a burden on the CPU incorporated therein can be reduced.

In the above embodiment, the image capturing device 30 is exposed to the reflected lights 18 based on the first through fourth modulated lights 12A through 12D in the respective first, third, fifth, and seventh frames, and the electric charges generated from the respective reflected lights are transferred in the second, fourth, sixth, and eighth frames. However, the image capturing device 30 may be exposed to the reflected light 18 based on the first modulated light 12A in the first frame, and in the second frame, the electric charge generated from the reflected light may be transferred while the image capturing device 30 may be exposed to the reflected light 18 based on the second modulated light 12B. In the third frame, the electric charge generated from the reflected light may be transferred while the image capturing device 30 may be exposed to the reflected light 18 based on the third modulated light 12C. In the fourth frame, the electric charge generated from the reflected light may be transferred while the image capturing device 30 may be exposed to the reflected light 18 based on the fourth modulated light 12D, and the electric charge generated from the reflected light may be transferred in the fifth frame.

A ranging apparatus 10B according to a second embodiment of the present invention (hereinafter referred to as "second ranging apparatus 10B") will be described below with reference to FIGS. 9 through 11.

Figure 9:
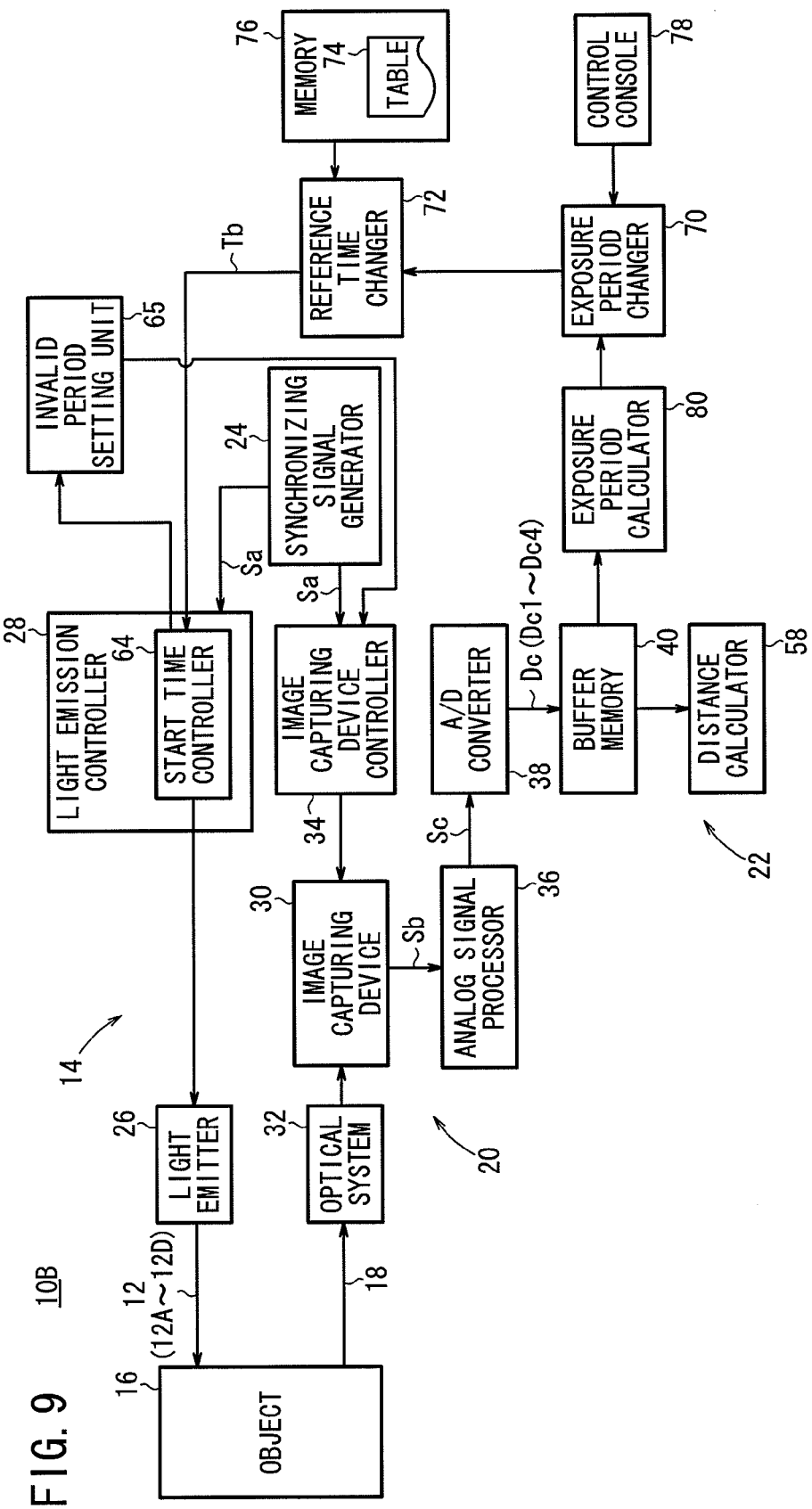
FIG. 9 is a block diagram of a second ranging apparatus according to the present invention.

As shown in FIG. 9, the second ranging apparatus 10B is similar to the first ranging apparatus 10A described above, but differs therefrom as follows:

The light-detecting means 20 additionally includes an exposure period changer 70 for changing the terminal ends of the exposure periods Tr based on an external control signal. The light-emitting means 14 additionally includes a first reference time changer 72 for changing the start timing of the reference time t0 based on the exposure periods Tr changed by the exposure period changer 70, and a memory 76 storing a first information table 74 which registers therein information on delay times (reference delay times Tb) for the reference time t0 which correspond to the changed exposure periods Tr.

The first reference time changer 72 changes the start timing of the reference time t0 based on the changed exposure periods Tr and the information registered in the first information table 74 stored in the memory 76. Specifically, the first reference time changer 72 reads the information on the reference delay time Tb corresponding to the changed exposure periods Tr, from among the reference delay times Tb registered in the first information table 74 stored in the memory 76, and supplies the read information to the start time controller 64. Based on the supplied information on the reference delay time Tb, the start time controller 64 sets a time point that is the reference delay times Tb later than the time point ta of the negative-going edge of the synchronizing signal Sa, as a new reference time t0, and controls respective emission start times of the first through fourth modulated lights 12A through 12D based on the new reference time t0.

The operating principles of the second ranging apparatus 10B will be described below with reference to FIGS. 10A and 10B.

Figure 10A:
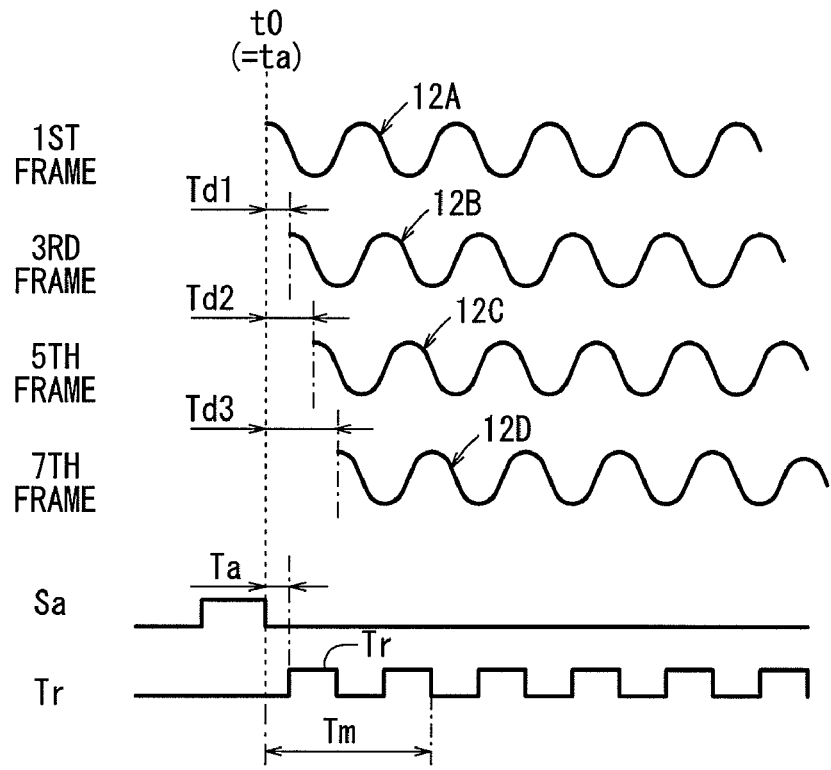
FIG. 10A is a waveform diagram showing the relationship between first through fourth modulated lights, a synchronizing signal, and exposure periods in a usual fashion.

Initially, as with the first ranging apparatus 10A, the start time controller 64 controls the light emitter 26 to emit a series of modulated lights, i.e., as shown in FIG. 10A, a first modulated light 12A which starts being emitted at the reference time t0 (the time point ta of the negative-going edge of the synchronizing signal), a second modulated light 12B which starts being emitted upon elapse of a first delay time Td1 from the reference time t0, a third modulated light 12C which starts being emitted upon elapse of a second delay time Td2 from the reference time t0, and a fourth modulated light 12D which starts being emitted upon elapse of a third delay time Td3 from the reference time t0.

The light-detecting means 20 obtains a sampled amplitude of the reflected light 18 when the phase of the first modulated light 12A is 270°, for example, and also obtains a sampled amplitude of the reflected light 18 when the phase of the second modulated light 12B is 180°. Similarly, the light-detecting means 20 obtains a sampled amplitude of the reflected light 18 when the phase of the third modulated light 12C is 90°, and also obtains a sampled amplitude of the reflected light 18 when the phase of the fourth modulated light 12D is 0°.

If the object 16 and its background are so bright that the signal generated by the light-detecting means 20 is saturated, then the durations of the exposure periods Tr may be changed by a user's command input, an automatic iris mechanism, or an electronic shutter combined with the image capturing device 30. In other words, the durations of the exposure periods Tr may be changed based on an external control signal. The durations of the exposure periods Tr are usually changed while the central points of the exposure periods Tr remain unchanged in position. Therefore, the start times of the exposure periods Tr are changed, and hence the timings at which the drive signal is applied to the image capturing device 30 need to be changed, resulting in the need for a calibration.

In the second ranging apparatus 10B, the exposure period changer 70 changes the exposure periods Tr based on a command signal from a user control console 78, i.e., a command signal from the user indicating whether the exposure periods Tr are to be shorter or longer, or a command signal from an exposure period calculator 80, i.e., a command signal indicating whether the exposure periods Tr are to be shorter or longer, based on the sampled amplitudes stored in the buffer memory 40.

The exposure period changer 70 may change the exposure periods Tr as follows: The exposure period changer 70 establishes several types of exposure periods Tr having different time lengths, e.g., at least two types of exposure periods Tr, in advance. When a command signal for shortening the exposure periods Tr is applied to the exposure period changer 70, the exposure period changer 70 selects exposure periods Tr that are one level shorter than the present exposure periods Tr. When a command signal for lengthening the exposure periods Tr is applied to the exposure period changer 70, the exposure period changer 70 selects exposure periods Tr that are one level longer than the present exposure periods Tr.

In this manner, the exposure period changer 70 can easily change the exposure periods Tr.

Figure 10B:
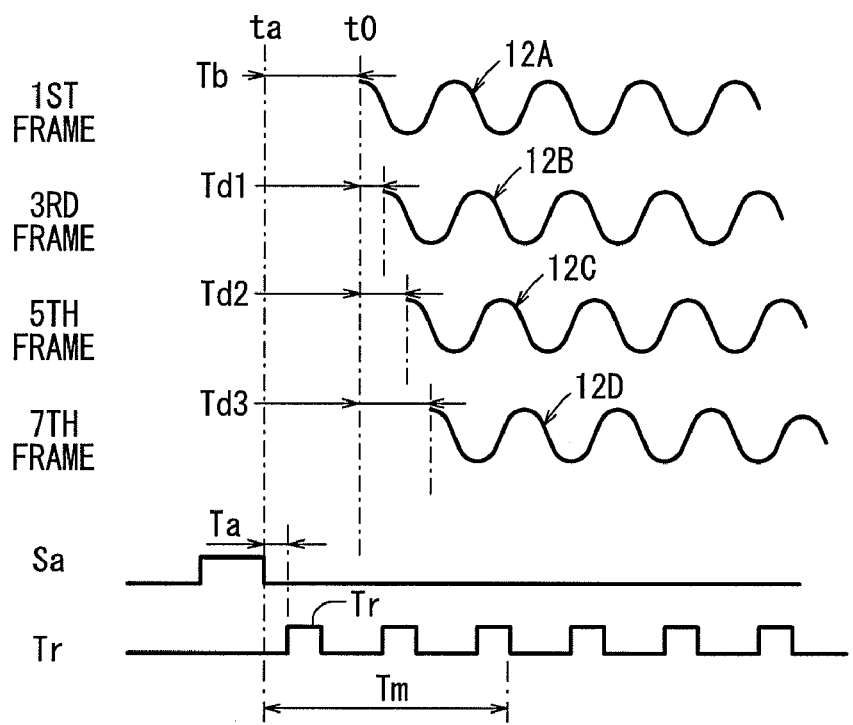
FIG. 10B is a waveform diagram showing the relationship between first through fourth modulated lights, a synchronizing signal, and exposure periods whose duration has been changed.

As shown in FIG. 10B, the exposure period changer 70 changes the durations of the exposure periods Tr by changing the terminal ends thereof. Therefore, the start timings of the exposure periods Tr which are not changed and the start timings of the exposure periods Tr which have been changed remain the same as each other. Instead, the central time points of the exposure periods Tr which have been changed are shifted out of alignment with the central time points of the exposure periods Tr which are not changed. Therefore, the reflected light 18 cannot be sampled at the given four phases (180°, 90°, 0°, 270°) of the first through fourth modulated lights 12A through 12D.

The above problem is solved as follows: The exposure period changer 70 assigns identification codes respectively to a plurality of types of exposure periods Tr that are established in advance. The exposure period changer 70 sends an identification code corresponding to the exposure periods Tr selected thereby to the first reference time changer 72, which recognizes the changed exposure periods Tr based on the identification code.

The first reference time changer 72 changes the start timing of the reference time t0 based on the changed exposure periods Tr (selected exposure periods) and the information registered in the first information table 74 stored in the memory 76. Specifically, since the first reference time changer 72 can recognize the changed exposure periods Tr based on the identification code sent from the exposure period changer 70, the information registered in the first information table 74 may include, as shown in FIG. 11, the identification codes of the exposure periods Tr and the delay times (reference delay times Tb) for the reference time which correspond to the identification codes of the exposure periods Tr.

A reference delay time Tb which corresponds to an identification code of exposure periods Tr is explained below. A time point which is the reference delay time Tb later than the time point ta of the negative-going edge of the synchronizing signal Sa, is set as a new reference time t0. The light emitter 26 emits the first modulated light 12A at the new reference time t0, the second modulated light 12B at a time point upon elapse of the first delay time Td1 from the new reference time t0, the third modulated light 12C at a time point upon elapse of the second delay time Td2 from the new reference time t0, and the fourth modulated light 12D at a time point upon elapse of the third delay time Td3 from the new reference time t0. The light-detecting means 20 can now obtain, at the central time points of the changed exposure periods Tr, a sampled amplitude of the reflected light 18 when the phase of the first modulated light 12A is 270°, a sampled amplitude of the reflected light 18 when the phase of the second modulated light 12B is 180°, a sampled amplitude of the reflected light 18 when the phase of the third modulated light 12C is 90°, and a sampled amplitude of the reflected light 18 when the phase of the fourth modulated light 12D is 0°.

The first reference time changer 72 reads the reference delay time Tb corresponding to the supplied identification code, from the first information table 74, and supplies the read reference delay time Tb to the start time controller 64. The start time controller 64 sets a time point which is the reference delay time Tb later than the time point ta of the negative-going edge of the synchronizing signal Sa, as a new reference time t0.

The invalid period setting unit 65 sets a new invalid period Tm including the first exposure period Tr from the new reference time t0 and the next exposure period Tr in addition to the reference delay time Tb.

Therefore, the light-detecting means 20 can sample the reflected light 18 at the given four phases (180°, 90°, 0°, 270°) of the first through fourth modulated lights 12A through 12D, at the central time points of the changed exposure periods Tr. The distance calculator 58 is now capable of calculating the distance up to the object 16 highly accurately, as with the distance calculator 58 of the first ranging apparatus 10A.

In the second ranging apparatus 10B, as described above, the exposure period changer 70 changes the terminal ends of the exposure periods Tr to change the durations of the exposure periods Tr, and the first reference time changer 72 changes the start timing of the reference time t0 based on the changed exposure periods Tr. Thus, it is not necessary to change the start times of the exposure periods Tr. Specifically, no calibration of the second ranging apparatus 10B is required because the start times of the exposure periods Tr are not changed.

In this case, the first information table 74 registers therein the information on the reference delay times Tb corresponding to the identification codes of the exposure periods Tr, and the start timing of the reference time t0 is changed based on the information registered in the first information table 74. Consequently, the start timing of the reference time t0 based on the changed exposure periods Tr can be determined simply by accessing the first information table 74, rather than by carrying out complex calculations. The processing time required by the second ranging apparatus 10B can thus be shortened.

A ranging apparatus 10C according to a third embodiment of the present invention (hereinafter referred to as "third ranging apparatus 10C") will be described below with reference to FIG. 12.

Figure 12:
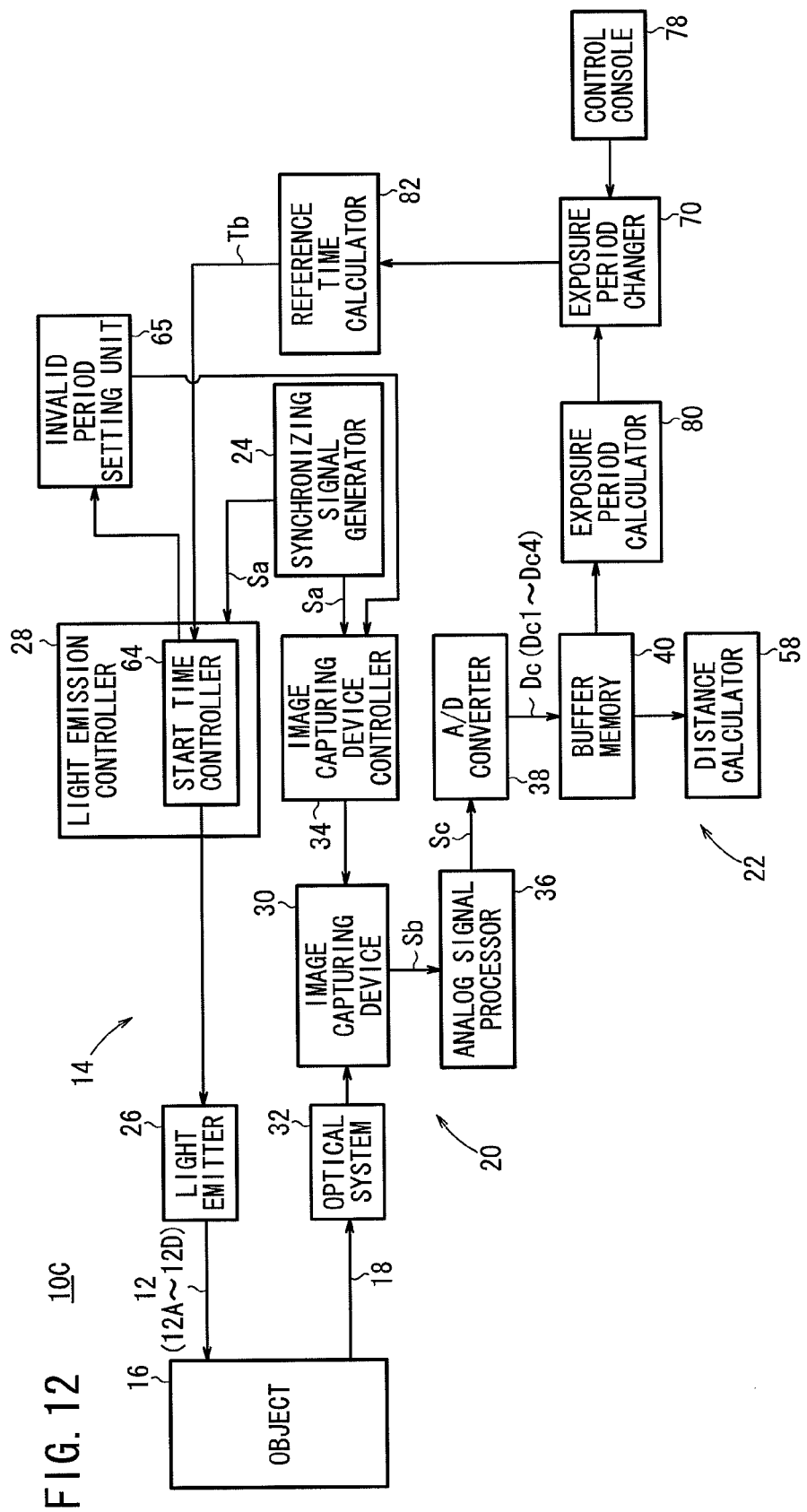
FIG. 12 is a block diagram of a third ranging apparatus according to the present invention.

As shown in FIG. 12, the third ranging apparatus 10C is similar to the second ranging apparatus 10B described above, except as follows:

The exposure period changer 70 has initial exposure periods Tr preset therein. When a command signal for shortening the exposure periods Tr is supplied to the exposure period changer 70, the exposure period changer 70 shortens the present exposure periods Tr by 1/n (n: real number). When a command signal for lengthening the exposure periods Tr is supplied to the exposure period changer 70, the exposure period changer 70 lengthens the present exposure periods Tr by 1/n (n: real number).

The third ranging apparatus 10C includes a first reference time calculator 82 for calculating the start timing of the reference time t0 based on the changed exposure periods Tr.

The first reference time calculator 82 calculates a delay time (reference delay time Tb) for the reference time t0 based on the durations of the changed exposure periods Tr. The reference delay time Tb is a time for allowing the reflected light 18 to be sampled at the given four phases (180°, 90°, 0°, 270°) of the first through fourth modulated lights 12A through 12D.

The calculated reference delay time Tb is supplied to the start time controller 64. The start time controller 64 sets a time point that is the reference delay times Tb later than the time point ta of the negative-going edge of the synchronizing signal Sa, as a new reference time t0.

The invalid period setting unit 65 sets an invalid period Tm including the first exposure period Tr from the new reference time t0 and the next exposure period Tr in addition to the reference delay time Tb.

Therefore, the light-detecting means 20 can sample the reflected light 18 at the given four phases (180°, 90°, 0°, 270°) of the first through fourth modulated lights 12A through 12D, at the central time points of the changed exposure periods Tr. The distance calculator 58 is now capable of calculating the distance up to the object 16 highly accurately, as with the distance calculator 58 of the second ranging apparatus 10B. The third ranging apparatus 10C does not need to have the memory 76 or a memory area for storing the first information table 74.

A ranging apparatus 10D according to a fourth embodiment of the present invention (hereinafter referred to as "fourth ranging apparatus 10D") will be described below with reference to FIGS. 13 through 14B.

Figure 13:
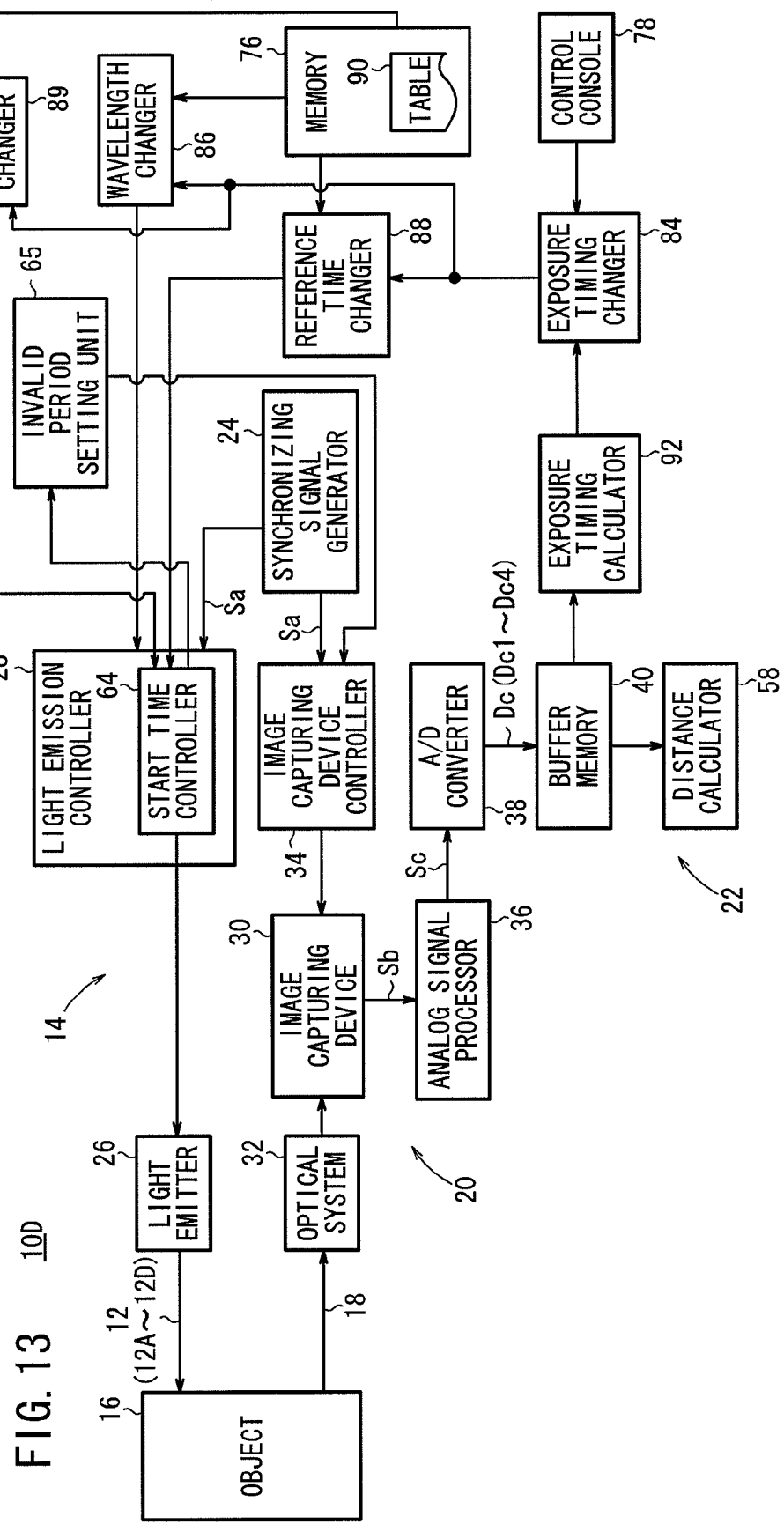
FIG. 13 is a block diagram of a fourth ranging apparatus according to the present invention.

As shown in FIG. 13, the fourth ranging apparatus 10D is similar to the first ranging apparatus 10A described above, but differs therefrom as follows:

The light-detecting means 20 includes an exposure timing changer 84 for changing the cycle length Tt (see FIGS. 14A and 14B) of the exposure periods Tr based on an external control signal. The light-emitting means 14 includes a wavelength changer 86 for changing the wavelengths Td (see FIGS. 14A and 14B) of a plurality of modulated lights 12 based on the cycle length Tt of the exposure periods Tr changed by the exposure timing changer 84, a second reference time changer 88 for changing the start timing of the reference time based on the cycle length Tt of the exposure periods Tr changed by the exposure timing changer 84, a start time changer 89 for changing time lengths (eleventh through thirteenth delay times Td11 through Td13) from a new reference time t0 to time points at which the second through fourth modulated lights 12B through 12D start being emitted based on the changed cycle length Tt of the exposure periods Tr, and a memory 76 storing a second information table 90 which registers therein the information on the wavelength Td of at least the first modulated light 12A which corresponds to the changed cycle length Tt of the exposure periods Tr, delay times (reference delay times Tb) for the reference time t0, and eleventh delay times Td11 of at least the second modulated light 12B. An eleventh delay time Td11 is set to a time corresponding to a phase delay of 90° with respect to the wavelength of the first modulated light 12A. Therefore, the time length of the eleventh delay time Td11 changes depending on the changed cycle length Tt of the exposure periods Tr.

The wavelength changer 86 changes the wavelengths Td of the first through fourth modulated lights 12A through 12D based on the changed cycle length Tt of the exposure periods Tr and the information (wavelength information) registered in the second information table 90 stored in the memory 76. The second reference time changer 88 changes the start timing of the reference time t0 based on the changed cycle length Tt of the exposure periods Tr and the reference delay times Tb registered in the second information table 90. The start time changer 89 changes the delay times Td11 through Td13 of the second through fourth modulated lights 12B through 12D based on the changed cycle length Tt of the exposure periods Tr and the eleventh delay time Td11 registered in the second information table 90.

The operating principles of the fourth ranging apparatus 10D will be described below with reference to FIGS. 14A and 14B.

Figure 14A:
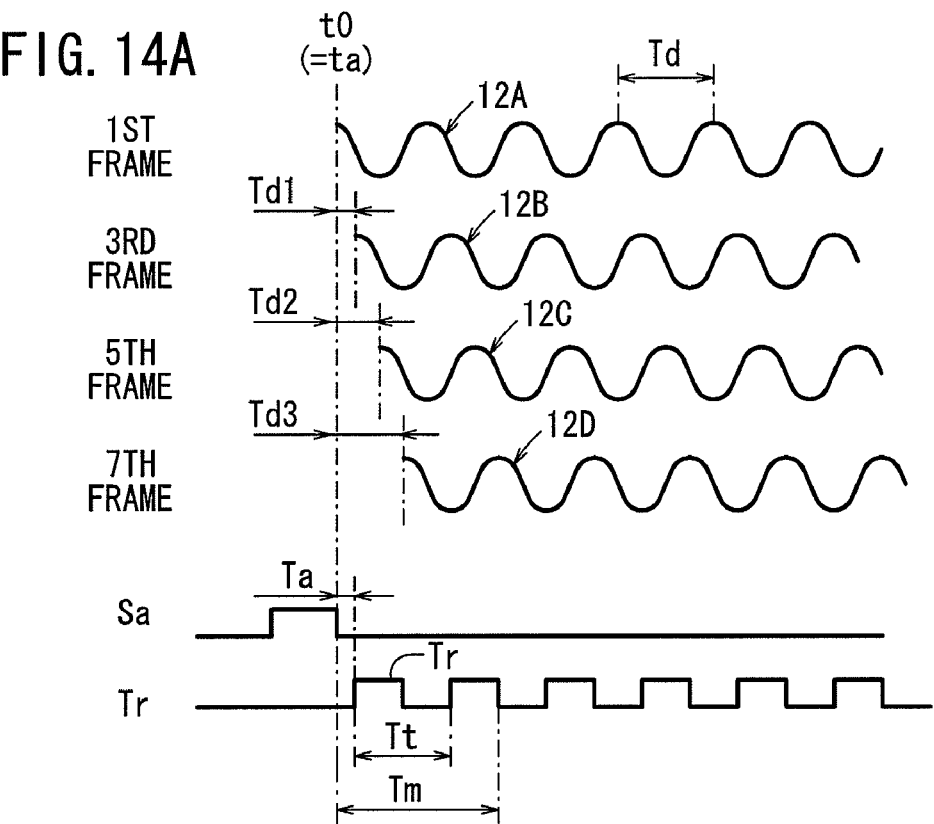
FIG. 14A is a waveform diagram showing the relationship between first through fourth modulated lights, a synchronizing signal, and exposure periods in a usual fashion.
Figure 14B:
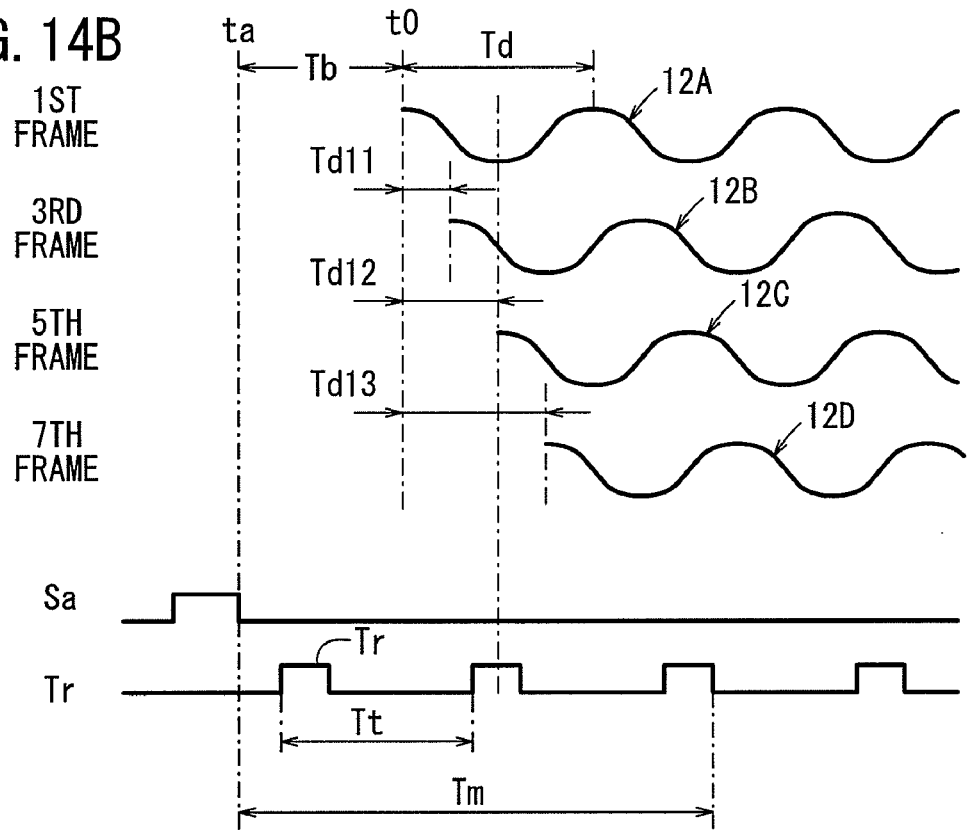
FIG. 14B is a waveform diagram showing the relationship between first through fourth modulated lights, a synchronizing signal, and exposure periods whose duration has been changed.

Initially, as with the first ranging apparatus 10A, the start time controller 64 controls the light emitter 26 to emit a series of modulated lights, i.e., as shown in FIG. 14A, a first modulated light 12A which starts being emitted at the time point ta of the negative-going edge of the synchronizing signal (the reference time t0 before it is changed), a second modulated light 12B which starts being emitted upon elapse of a first delay time Td1 from the reference time t0, a third modulated light 12C which starts being emitted upon elapse of a second delay time Td2 from the reference time t0, and a fourth modulated light 12D which starts being emitted upon elapse of a third delay time Td3 from the reference time t0.

The light-detecting means 20 obtains a sampled amplitude S4 of the reflected light 18 when the phase of the first modulated light 12A is 270°, for example, and also obtains a sampled amplitude S3 of the reflected light 18 when the phase of the second modulated light 12B is 180°. Similarly, the light-detecting means 20 obtains a sampled amplitude S2 of the reflected light 18 when the phase of the third modulated light 12C is 90°, and also obtains a sampled amplitude S1 of the reflected light 18 when the phase of the fourth modulated light 12D is 0°.

If the distance up to the object 16 is so large that the calculated distance is of an invalid value, then the time length of one frame may be changed by a CPU control signal or a user's command input, thereby changing the wavelength Td of the modulated light 12. In other words, the time length of one frame may be changed based on an external control signal. In this case, the central time points of the exposure periods Tr are usually determined depending on the changed time length of one frame. If the cycle length Tt of the exposure periods Tr is changed to a value which is related to the preset cycle length Tt of the exposure periods Tr by an integral number, e.g., if the cycle length Tt of the exposure periods Tr is divided by an integer or multiplied by an integer, then the process is simple. However, if the cycle length Tt of the exposure periods Tr is changed to a value which is related to the preset cycle time Tt of the exposure periods Tr by a real number, then the fourth ranging apparatus 10 needs a dedicated calibration.

In the fourth ranging apparatus 10D, the wavelength changer 86 changes the wavelengths Td of the first through fourth modulated lights 12A through 12D based on a command signal from a user control console 78, i.e., a command signal from the user indicating whether the time length of one frame is to be shorter or longer, or a command signal from an exposure timing calculator 92 for calculating whether the time length of one frame is to be shorter or longer, i.e., a command signal indicating whether the time length of one frame is to be shorter or longer, based on the sampled amplitudes stored in the buffer memory 40.

Likewise, the exposure timing changer 84 changes the cycle length Tt of the exposure periods Tr based on a command signal from the user control console 78 or a command signal from the exposure timing calculator 92.

The exposure timing changer 84 may change the cycle length Tt of the exposure periods Tr as follows: The exposure timing changer 84 establishes several types of cycle lengths Tt having different time lengths, e.g., at least two types of cycle lengths Tt, in advance. When a command signal for shortening one frame is applied to the exposure timing changer 84, the exposure timing changer 84 selects a cycle length Tt that is one level shorter than the cycle length Tt of the present exposure periods Tr. When a command signal for lengthening one frame is applied to the exposure timing changer 84, the exposure timing changer 84 selects a cycle length Tt that is one level longer than the cycle length Tt of the present exposure periods Tr.

The wavelengths Td of the first through fourth modulated lights 12A through 12D can be set depending on the changed cycle length Tt of the exposure periods Tr according to the above process. Thus, the cycle length Tt of the exposure periods Tr can be changed to a value which is related to the preset cycle length Tt of the exposure periods Tr by an integral number, e.g., the cycle length Tt of the exposure periods Tr can be divided by an integer or multiplied by an integer. Accordingly, the circuit arrangement of the fourth ranging apparatus 10D is relatively simple.

If the cycle length Tt of the exposure periods Tr is changed to a value which is related to the preset cycle length Tt of the exposure periods Tr by an integral number, e.g., the cycle length Tt of the exposure periods Tr is divided by an integer or multiplied by an integer, then the reflected light 18 can be sampled at the given four phases (180°, 90°, 0°, 270°) of the first through fourth modulated lights 12A through 12D providing the wavelength Td of the first through fourth modulated lights 12A through 12D remains unchanged. However, when the wavelength Td of the first through fourth modulated lights 12A through 12D is changed, the reflected light 18 cannot be sampled at the given four phases (180°, 90°, 0°, 270°) of the first through fourth modulated lights 12A through 12D.

The above problem is solved as follows: The exposure timing changer 84 assigns identification codes respectively to the cycle lengths Tt of a plurality of types of exposure periods Tr that are established in advance. The exposure timing changer 84 sends an identification code corresponding to the cycle length Tt of exposure periods Tr selected thereby to the wavelength changer 86, the second reference time changer 88, and the start time changer 89, which recognize the changed cycle length Tt of the exposure periods Tr based on the identification code.

The wavelength changer 86 changes the wavelengths Td of the first through fourth modulated lights 12A through 12D based on the changed cycle length Tt of the exposure periods Tr (selected cycle length Tt of the exposure periods Tr) and the information registered in the second information table 90 stored in the memory 76. The second reference time changer 88 changes the start timing of the reference time t0 based on the changed cycle length Tt of the exposure periods Tr and the information registered in the second information table 90. The start time changer 89 changes the delay times Td11 through Td13 of the second through fourth modulated lights 12B through 12D based on the changed cycle length Tt of the exposure periods Tr and the information registered in the second information table 90.

Specifically, inasmuch as the changed cycle length Tt of the exposure periods Tr can be recognized from the identification code sent from the exposure timing changer 84, the information registered in the second information table 90 may include, as shown in FIG. 15, the identification codes of the cycle lengths Tt of the exposure periods Tr, wavelength information and information on the reference delay times and the eleventh delay time Td11, corresponding to the identification codes of the cycle lengths Tt of the exposure periods Tr.

A reference delay time Tb and an eleventh delay time Td11, corresponding to the identification codes of exposure periods Tr will be explained below. The wavelength Td of the first modulated light 12A, for example, is changed to the wavelength indicated by the wavelength information corresponding to the identification code, and the reference time t0 is changed to a time point upon elapse of the reference delay time Tb. Delay times from the changed reference time t0 to time points at which the second through fourth modulated lights 12B through 12D start being emitted, are changed based on the eleventh delay time Td11. As shown in FIG. 14B, the light-detecting means 20 can now obtain, at the central time points of the changed exposure periods Tr, a sampled amplitude of the reflected light 18 when the phase of the first modulated light 12A is 270°, a sampled amplitude of the reflected light 18 when the phase of the second modulated light 12B is 180°, a sampled amplitude of the reflected light 18 when the phase of the third modulated light 12C is 90°, and a sampled amplitude of the reflected light 18 when the phase of the fourth modulated light 12D is 0°.

The wavelength changer 86 reads the information on the wavelength corresponding to the changed cycle length Tt of the exposure periods Tr, from among the information on the wavelengths registered in the second information table 90 stored in the memory 76, and supplies the read information to the light emission controller 28. Based on the supplied information on the wavelength, the light emission controller 28 changes the wavelengths of the first through fourth modulated lights 12A through 12D.

The second reference time changer 88 reads the information on the reference delay time Tb corresponding to the changed cycle length Tt of the exposure periods Tr, from among the information on the reference delay times Tb registered in the second information table 90, and supplies the read information to the start time controller 64. Based on the supplied information on the reference delay time Tb, the start time controller 64 sets a time point that is the reference delay times Tb later than the time point ta of the negative-going edge of the synchronizing signal Sa, as a new reference time t0.

The start time changer 89 reads the information on the eleventh delay time Td11 corresponding to the changed cycle length Tt of the exposure periods Tr, from among the information on the eleventh delay times Td11 registered in the second information table 90, and supplies the read information to the start time controller 64. Based on the supplied information on the eleventh delay time Td11, the start time controller 64 sets a twelfth delay time Td12 and a thirteenth delay time Td13. The twelfth delay time Td12 is set to a time corresponding to a phase delay of 180° with respect to the changed wavelength of the first modulated light 12A, and the thirteenth delay time Td13 is set to a time corresponding to a phase delay of 270° with respect to the changed wavelength of the first modulated light 12A.

The invalid period setting unit 65 sets an invalid period Tm including the changed first exposure period Tr from the new reference time t0 and the next exposure period Tr, in addition to the reference delay time Tb.

Therefore, the light-detecting means 20 can sample the reflected light 18 at the given four phases (180°, 90°, 0°, 270°) of the first through fourth modulated lights 12A through 12D, at the central time points of the exposure periods Tr whose cycle length has been changed. The distance calculator 58 is now capable of calculating the distance up to the object 16 highly accurately, as with the distance calculator 58 of the first ranging apparatus 10A, even though the distance up to the object 16 is large.

In the fourth ranging apparatus 10D, the exposure timing changer 84 changes the cycle length Tt of the exposure periods Tr, the wavelength changer 86 changes the wavelengths Td of the first through fourth modulated lights 12A through 12D based on the changed cycle length Tt of the exposure periods Tr, the second reference time changer 88 changes the start timing of the reference time t0 based on the changed cycle length Tt of the exposure periods Tr, and the start time changer 89 changes time lengths (eleventh through thirteenth delay times Td11 through Td13) from the new reference time t0 to time points at which the second through fourth modulated lights 12B through 12D start being emitted. Therefore, the wavelengths Td of the modulated lights 12 can be set depending on the cycle length Tt of the exposure periods Tr. As a result, the exposure timings can be changed to a value which is related to the preset cycle length Tt of the exposure periods Tr by an integral number, e.g., the exposure timings can be divided by an integer or multiplied by an integer. Therefore, the circuit arrangement of the fourth ranging apparatus 10D is relatively simple.

In this case, the second information table 90 registers therein the information on the wavelengths Td of the first modulated light 12A, the reference delay times Tb, and the eleventh delay times Td11, corresponding to the identification codes of the cycle lengths Tt of the exposure periods Tr, and the wavelengths Td of the first through fourth modulated lights 12A through 12D, the start timing of the reference time t0, and the eleventh through thirteenth delay times Td11 through Td14 are changed based on the information registered in the second information table 90. Consequently, the wavelengths Td of the first through fourth modulated lights 12A through 12D based on the changed cycle length Tt of the exposure periods Tr, the reference delay times Tb, and the eleventh through thirteenth delay times Td11 through Td13 can be determined simply by accessing the second information table 90, rather than by carrying out complex calculations. The processing time required by the fourth ranging apparatus 10D can thus be shortened.

A ranging apparatus 10E according to a fifth embodiment of the present invention (hereinafter referred to as "fifth ranging apparatus 10E") will be described below with reference to FIG. 16.

Figure 16:
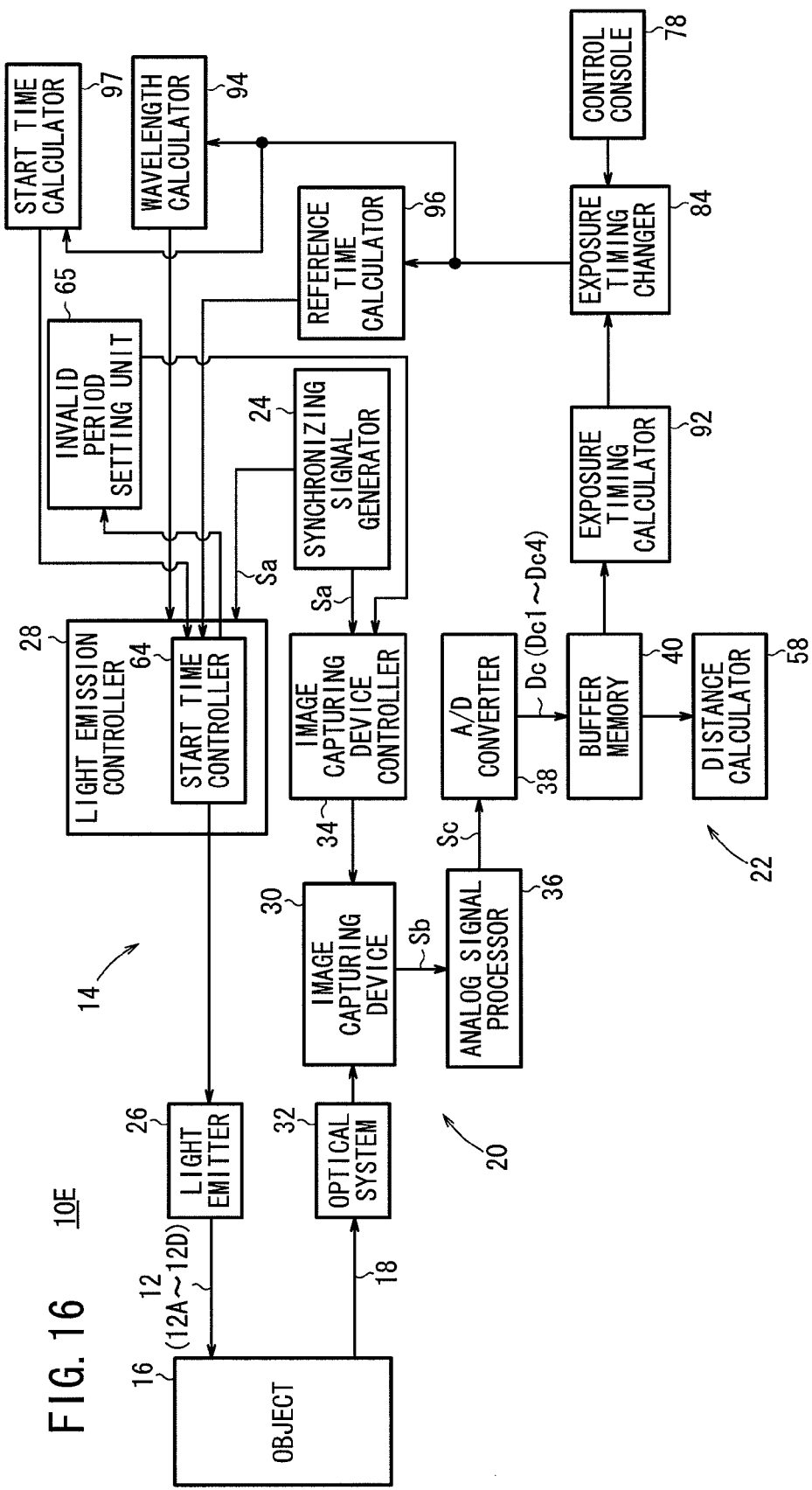
FIG. 16 is a block diagram of a fifth ranging apparatus according to the present invention.

As shown in FIG. 16, the fifth ranging apparatus 10E is similar to the fourth ranging apparatus 10D described above, but differs therefrom as follows:

The exposure timing changer 84 has the cycle length Tt of initial exposure periods Tr preset therein. When a command signal for shortening the cycle length Tt of the exposure periods Tr is supplied to the exposure timing changer 84, the exposure timing changer 84 shortens the cycle length Tt of the present exposure periods Tr by 1/m (m: integral number).

When a command signal for lengthening the cycle length Tt of the exposure periods Tr is supplied to the exposure timing changer 84, the exposure timing changer 84 lengthens the cycle length Tt of the present exposure periods Tr by 1/m (m: integral number).

The fifth ranging apparatus 10E includes a wavelength calculator 94 for calculating the wavelengths Td of the first through fourth modulated lights 12A through 12D based on the changed cycle length Tt of the exposure periods Tr, a second reference time calculator 96 for calculating the start timing of the reference time t0, and a start time calculator 97 for calculating time lengths (eleventh through thirteenth delay times Td11 through Td13) from a new reference time t0 to time points at which the second through fourth modulated lights 12B through 12D start being emitted.

The wavelength calculator 94 calculates the wavelengths Td of the first through fourth modulated lights 12A through 12D based on the changed cycle length Tt of the exposure periods Tr. The second reference time calculator 96 calculates a reference delay time Tb based on the changed cycle length Tt of the exposure periods Tr. The start time calculator 97 calculates an eleventh delay time Td11 based on the changed cycle length Tt of the exposure periods Tr.

The reference delay time Tb and the eleventh delay time Td11 which are calculated will be explained below. The wavelength Td of the first modulated light 12A is changed to a wavelength represented by the wavelength information corresponding to the identification code, and the reference time t0 is changed to a time point upon elapse of the reference delay time Tb. The delay times from the changed reference time t0 to the time points at which the second through fourth modulated lights 12B through 12D start being emitted are changed based on the eleventh delay time Td11. Therefore, the reflected light 18 can be sampled at the given four phases (180°, 90°, 0°, 270°) of the first through fourth modulated lights 12A through 12D at the central time points of the changed exposure periods Tr whose cycle length Tt has been changed.

The distance calculator 58 is now capable of calculating the distance up to the object 16 highly accurately, as with the distance calculator 58 of the fourth ranging apparatus 10D. The fifth ranging apparatus 10E does not need to have the memory 76 or a memory area for storing the second information table 90.

A ranging apparatus 10F according to a sixth embodiment of the present invention (hereinafter referred to as "sixth ranging apparatus 10F") will be described below with reference to FIG. 17.

Figure 17:
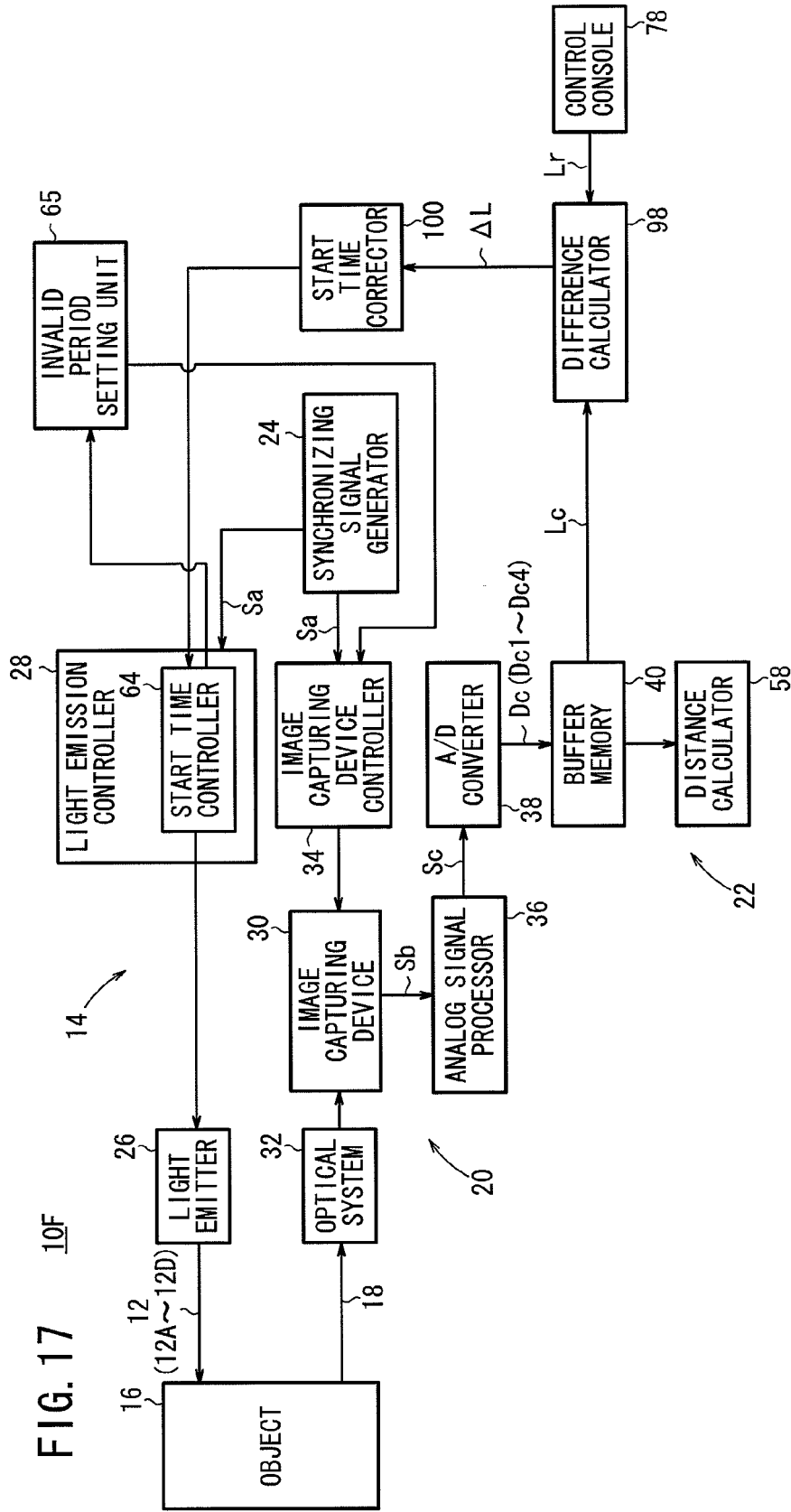
FIG. 17 is a block diagram of a sixth ranging apparatus according to the present invention.
Figure 18:
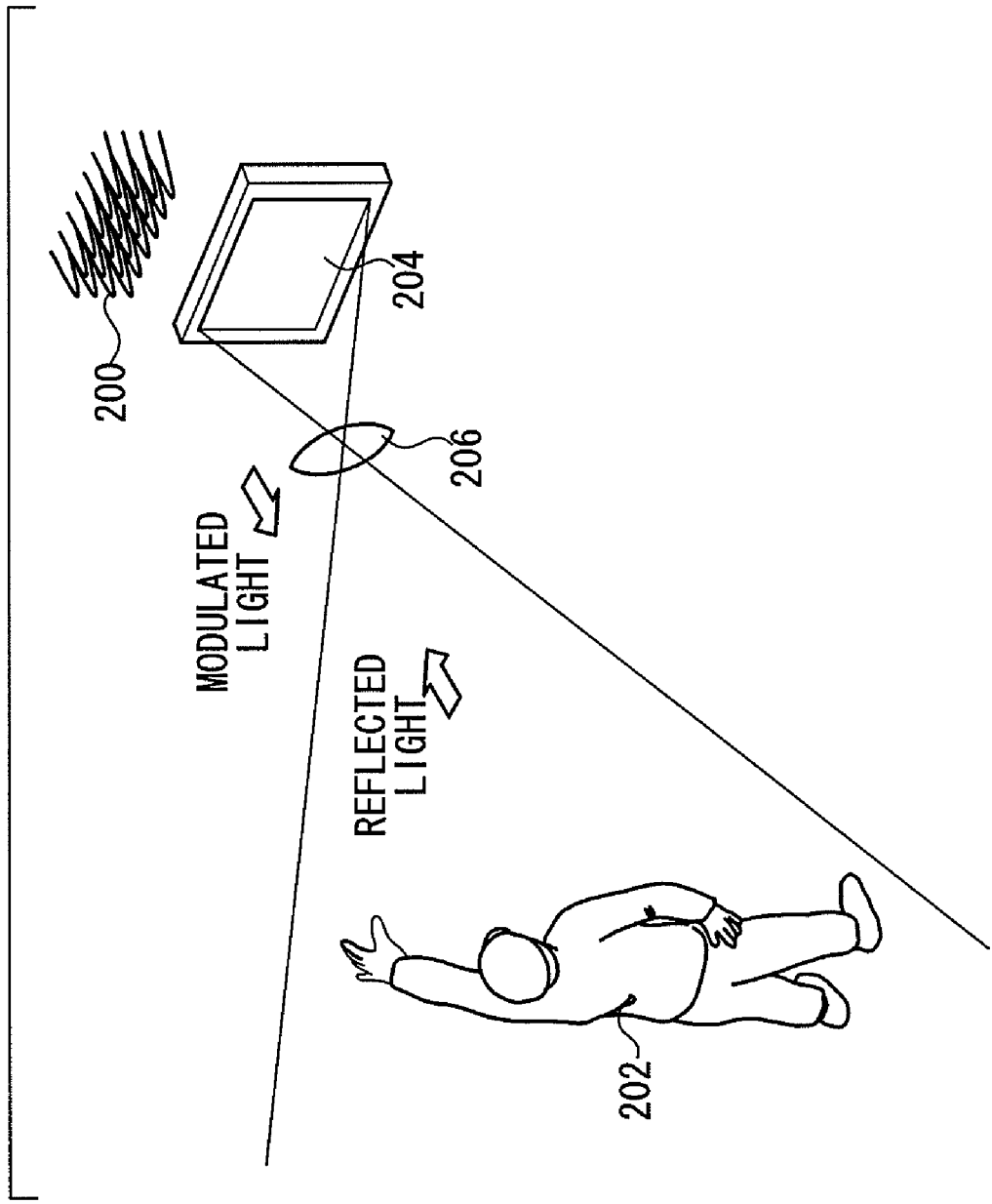
FIG. 18 is a view illustrative of an optical TOF ranging process.
Figure 19:
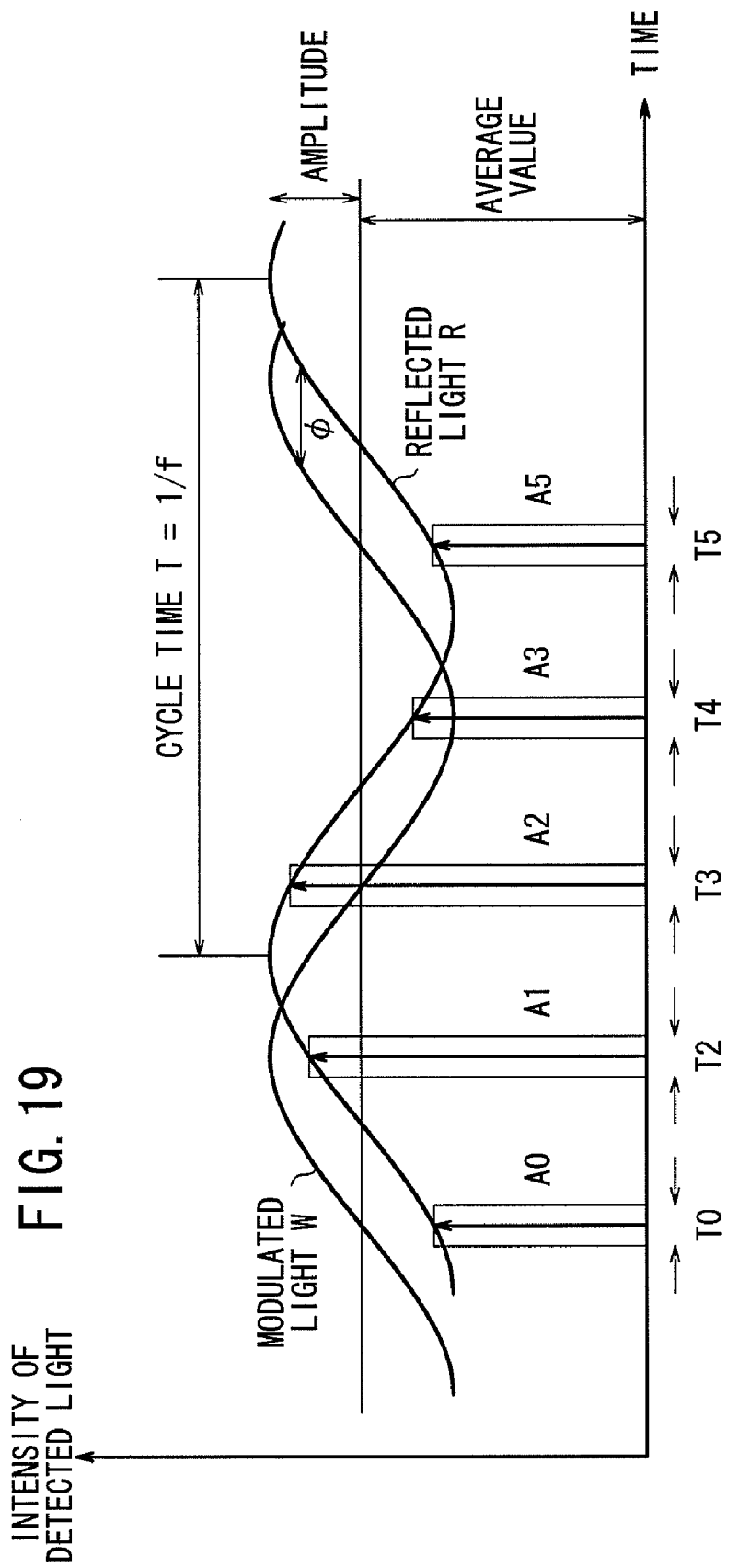
FIG. 19 is a waveform diagram showing a phase delay that a reflected light undergoes with respect to a modulated light.
Figure 21A:
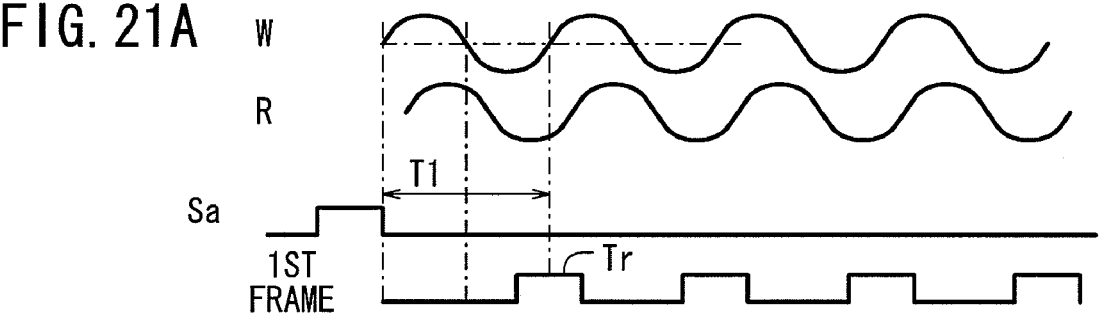
FIG. 21A is a waveform diagram showing the relationship between a modulated light, a reflected light thereof, a synchronizing signal, and exposure periods in a first frame in the ranging apparatus according to the related art.
Figure 21B:
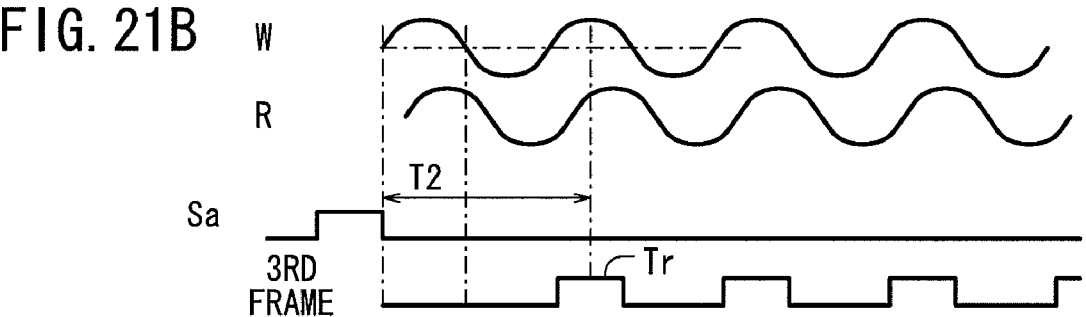
FIG. 21B is a waveform diagram showing the relationship between the modulated light, the reflected light, the synchronizing signal, and exposure periods in a third frame in the ranging apparatus according to the related art.
Figure 21C:
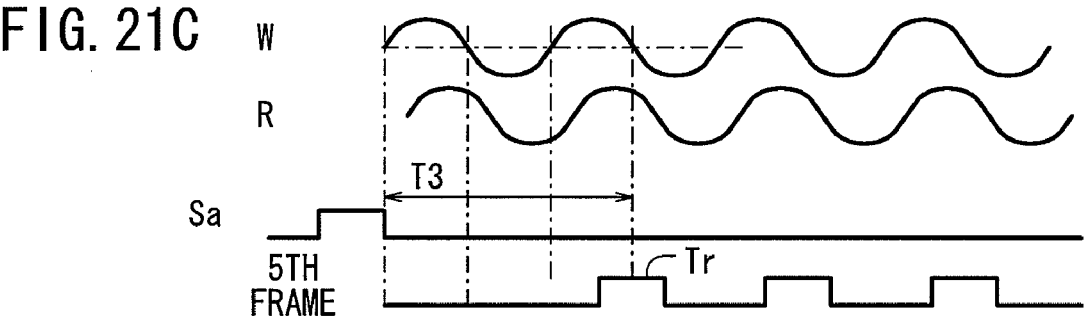
FIG. 21C is a waveform diagram showing the relationship between the modulated light, the reflected light, the synchronizing signal, and exposure periods in a fifth frame in the ranging apparatus according to the related art.
Figure 21D:
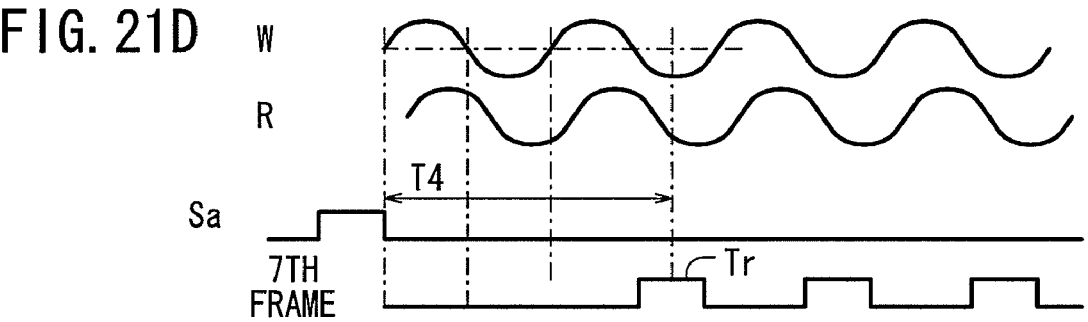
FIG. 21D is a waveform diagram showing the relationship between the modulated light, the reflected light, the synchronizing signal, and exposure periods in a seventh frame in the ranging apparatus according to the related art.

As shown in FIG. 17, the sixth ranging apparatus 10F is similar to the first ranging apparatus 10A described above, but differs therefrom in that it includes a difference calculator 98 and a start time corrector 100.

The difference calculator 98 calculates the difference ΔL between the distance up to the object 16 which has been calculated by the distance calculator 58 (calculated distance Lc) and the measured distance Lr up to the object 16 which has been input from the control console 78.

The start time corrector 100 corrects time lengths (first through third delay times Td1 through Td3) from a reference time to time points at which the second through fourth modulated lights 12B through 12D start being emitted, based on the difference ΔL calculated by the difference calculator 98.

Specifically, the start time corrector 100 calculates a delay time (the first delay time Td1) of the second modulated light 12B from the reference time t0 based on the difference ΔL calculated by the difference calculator 98. If the distance up to the object 16 which has been calculated by the distance calculator 58 (calculated distance Lc) is shorter than the measured distance Lr up to the object 16 which has been input from the control console 78, then the start time corrector 100 sets the first delay time Td1 to a value shorter (or longer) than the present set time. Conversely, if the calculated distance Lc is longer than the measured distance Lr, then the start time corrector 100 sets the first delay time Td1 to a value longer (or shorter) than the present set time.

The start time corrector 100 supplies the set first delay time Td1 to the start time controller 64. Based on the supplied first delay time Td1, the start time controller 64 sets a second delay time Td2 and a third delay time Td3. The second delay time Td2 is set to a time corresponding to a phase delay of 180° with respect to the wavelength of the first modulated light 12A, and the third delay time Td3 is set to a time corresponding to a phase delay of 270° with respect to the wavelength of the first modulated light 12A.

The distance calculator 58 calculates the distance Lc up to the object 16 based on the corrected start times and compares the calculated distance Lc with the measured distance Lr again.

If the calculated distance Lc and the measured distance Lr agree or substantially agree with each other, the operation of the difference calculator 98 and the start time corrector 100 is put to an end.

Since the sixth ranging apparatus 10F can correct an error of the distance measured up to the object 16, the sixth ranging apparatus 10F can measure the distance accurately and stably.

In each of the above embodiments, the ranging apparatus is arranged to generate and apply four modulated lights, i.e., the first through fourth modulated lights 12A through 12D. However, the ranging apparatus may be arranged to generate and apply three modulated lights or more than five modulated lights.

Although certain preferred embodiments of the present invention have been shown and described in detail, it should be understood that various changes and modifications may be made therein without departing from the scope of the appended claims.

What is claimed is:

1. A ranging apparatus comprising:
a light-emitting unit for emitting a series of modulated lights which are intensity-modulated and have respective different time lengths from a reference time to respective time points at which the modulated lights start being emitted;
a light-detecting unit for detecting reflected lights from an object that is irradiated with said modulated lights; and
a calculating unit for calculating a distance up to said object based on a phase difference between said modulated lights and said reflected lights,
wherein said light-detecting unit samples amounts of the reflected lights in exposure periods established at a constant cycle length from said reference time,
wherein said light-detecting unit comprises an exposure period changer for changing terminal ends of said exposure periods based on an external control signal, and
wherein said light-emitting unit comprises a reference time changer for changing a start timing of said reference time based on said exposure periods which have been changed by said exposure period changer.

2. A ranging apparatus according to claim 1, wherein said light-emitting unit comprises:
a light emitter and a light emission controller for intensity-modulating a light emitted from said light emitter and emitting the intensity-modulated light as said modulated lights;

said light emission controller including a start time controller for controlling said time lengths.

3. A ranging apparatus according to claim 1, wherein said light-detecting unit comprises:
an invalid period setting unit for setting an invalid period during which said light-detecting unit does not sample the amounts of the reflected lights in at least the exposure periods that are included in said time lengths.

4. A ranging apparatus according to claim 1, further comprising:
a memory storing a table which registers therein information on the start timing of said reference time which corresponds to the changed exposure periods;
wherein said reference time changer changes the start timing of said reference time based on the changed exposure periods and the information registered in said table stored in said memory.

5. A ranging apparatus according to claim 1, further comprising:
a reference time calculator for calculating the start timing of said reference time based on the changed exposure periods;
wherein said reference time changer changes the start timing of said reference time based on timing information from said reference time calculator.

6. A ranging apparatus according to claim 1, wherein said light-emitting unit emits a first modulated light over a predetermined period from a first emission start reference time and a second modulated light over said predetermined period from a second emission start reference time, said first and second emission start reference times being different from each other;
said light-detecting unit detects a first reflected light from said object irradiated with said first modulated light over said predetermined period from said first emission start reference time and a second reflected light from said object irradiated with said second modulated light over said predetermined period from said second emission start reference time; and
said calculating unit calculates the distance up to said object based on at least the phase difference between said first modulated light and said first reflected light and the phase difference between said second modulated light and said second reflected light.

7. A ranging apparatus according to claim 6, wherein said light-detecting unit samples an amount of the first reflected light in exposure periods established at a constant cycle length from said first emission start reference time and an amount of the second reflected light in exposure periods established at the constant cycle length from said second emission start reference time;
said calculating unit invalidates, in terms of calculation of the distance, the amounts of the first and second reflected lights sampled in the exposure periods that are included in said time lengths; and
said calculating unit calculates a value representing the sampled amount of the first reflected light which is integrated over said predetermined period, as said phase difference between said first modulated light and said first reflected light, and a value representing the sampled amount of the second reflected light which is integrated over said predetermined period, as said phase difference between said second modulated light and said second reflected light.

8. A ranging apparatus comprising:
a light-emitting unit for emitting a series of modulated lights which are intensity-modulated and have respective different time lengths from a reference time to respective time points at which the modulated lights start being emitted;
a light-detecting unit for detecting reflected lights from an object that is irradiated with said modulated lights; and
a calculating unit for calculating a distance up to said object based on a phase difference between said modulated lights and said reflected lights,
wherein said light-detecting unit samples amounts of the reflected lights in exposure periods established at a constant cycle length from said reference time,
wherein said light-detecting unit comprises:
an exposure timing changer for changing said cycle length of said exposure periods based on an external control signal; and
wherein said light-emitting unit comprises:
a wavelength changer for changing respective wavelengths of said modulated lights based on the cycle length of said exposure periods which has been changed by said exposure timing changer;
a reference time changer for changing a start timing of said reference time based on the changed cycle length of said exposure periods; and
a start time changer for changing said time lengths based on the changed cycle length of said exposure periods.

9. A ranging apparatus according to claim 8, further comprising:
a memory storing a table which registers therein information on the wavelengths of said modulated lights corresponding to the changed cycle length of said exposure periods, the start timing of said reference time, and said time lengths;
wherein said wavelength changer changes the wavelengths of said modulated lights based on the changed cycle length of said exposure periods and the information registered in said table stored in said memory;
said reference time changer changes the start timing of said reference time based on the changed cycle length of said exposure periods and the information registered in said table; and
said start time changer changes said time lengths based on the changed cycle length of said exposure periods and the information registered in said table.

10. A ranging apparatus according to claim 8, further comprising:
a wavelength calculator for calculating the wavelengths of said modulated lights based on the changed cycle length of said exposure periods;
a reference time calculator for calculating the start timing of said reference time based on the changed cycle length of said exposure periods; and
a start time calculator for calculating said time lengths based on the changed cycle length of said exposure periods.

11. A ranging apparatus comprising:
a light-emitting unit for emitting a series of modulated lights which are intensity-modulated and have respective different time lengths from a reference time to respective time points at which the modulated lights start being emitted;
a light-detecting unit for detecting reflected lights from an object that is irradiated with said modulated lights;
a calculating unit for calculating a distance up to said object based on a phase difference between said modulated lights and said reflected lights; and
a start time corrector for correcting said time lengths based on a difference between the distance up to said object which is calculated by said calculating unit and a distance measured up to said object.

12. A ranging method comprising the steps of:
(a) emitting a series of modulated lights which are intensity-modulated and have respective different time lengths from a reference time to respective time points at which the modulated lights start being emitted;
(b) detecting reflected lights from an object that is irradiated with said modulated lights;
(c) calculating a distance up to said object based on a phase difference between said modulated lights and said reflected lights; and
correcting said time lengths based on a difference between the distance up to said object which is calculated in said step (c) and a distance measured up to said object.

13. A ranging method according to claim 12, wherein said step (a) comprises:
emitting a first modulated light over a predetermined period from a first emission start reference time and a second modulated light over said predetermined period from a second emission start reference time, said first and second emission start reference times being different from each other;
wherein said step (b) comprises:
detecting a first reflected light from said object irradiated with said first modulated light over said predetermined period from said first emission start reference time, and a second reflected light from said object irradiated with said second modulated light over said predetermined period from said second emission start reference time; and
wherein said step (c) comprises:
calculating the distance up to said object based on at least the phase difference between said first modulated light and said first reflected light, and the phase difference between said second modulated light and said second reflected light.

14. A ranging method according to claim 13, wherein said step (b) comprises:
sampling an amount of the first reflected light in exposure periods established at a constant cycle length from said first emission start reference time and an amount of the second reflected light in exposure periods established at the constant cycle length from said second emission start reference time;
wherein said step (c) comprises invalidating, in terms of the distance, the amounts of the first and second reflected lights sampled in the exposure periods that are included in said time lengths; and
said step (c) comprises calculating a value representing the sampled amount of the first reflected light which is integrated over said predetermined period, as said phase difference between said first modulated light and said first reflected light and a value representing the sampled amount of the second reflected light which is integrated over said predetermined period, as said phase difference between said second modulated light and said second reflected light.

* * * * *